(12) United States Patent
Kanai et al.

(10) Patent No.: US 6,575,146 B1
(45) Date of Patent: Jun. 10, 2003

(54) DIAGNOSTIC APPARATUS FOR AN EVAPORATED FUEL SYSTEM, AND VEHICLE CONTROL APPARATUS FOR A VEHICLE EQUIPPED WITH THE DIAGNOSTIC APPARATUS

(75) Inventors: Hiroshi Kanai, Susono (JP); Yoshihiko Hyoudou, Gotenba (JP); Takuya Matsuoka, Susono (JP); Naoya Takagi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 280 days.

(21) Appl. No.: 09/693,453

(22) Filed: Oct. 20, 2000

(30) Foreign Application Priority Data

Oct. 22, 1999 (JP) .............................. 11-301612
Apr. 12, 2000 (JP) ......................... 2000-111155

(51) Int. Cl.<sup>7</sup> .................. F02M 25/08; B60K 15/04; G01M 15/00
(52) U.S. Cl. ..................... 123/520; 73/118.1
(58) Field of Search ............... 123/518, 519, 123/520, 198 D; 180/65.2; 73/117.3, 118.1

(56) References Cited

U.S. PATENT DOCUMENTS 5,295,472 A    3/1994  Otsuka et al. .............. 123/520
5,572,981 A  * 11/1996  Pfleger et al. ........... 123/520 X
6,082,189 A  *  7/2000  Bayerle et al. ............ 73/118.1

FOREIGN PATENT DOCUMENTS

| JP | 5-156973 | 6/1993 |
| JP | 5-180099 | 7/1993 |
| JP | 9-291856 | 11/1997 |
| JP | 9-303214 | 11/1997 |
| JP | 11-264350 | 9/1999 |

* cited by examiner

Primary Examiner—Tony M. Argenbright
(74) Attorney, Agent, or Firm—Kenyon & Kenyon

(57) ABSTRACT

The present invention provides an evaporated fuel system diagnostic apparatus. The evaporated fuel system diagnostic apparatus includes a malfunction determination unit which determines whether a malfunction occurs in an evaporated fuel system, by introducing a negative pressure of an intake passage into a fuel tank. An operating condition setting unit sets, when the malfunction determination unit has started the introduction of the negative pressure of the intake passage into the fuel tank, an operating condition of an internal combustion engine in a predetermined condition that causes the negative pressure of the intake passage to be within a predetermined pressure range. Further, the present invention provides a vehicle control apparatus for an automotive vehicle equipped with the evaporated fuel system diagnostic apparatus.

5 Claims, 17 Drawing Sheets

FIG.9

| NE(rpm)<br>ATM(mmHg) | 600 | 1000 | 1400 | 1800 | 2200 |
|---|---|---|---|---|---|
| 760 | 4.0 | 5.1 | 6.3 | 7.5 | 9.0 |
| 660 | 3.8 | 4.9 | 5.9 | 7.0 | 8.5 |
| 560 | 3.6 | 4.7 | 5.4 | 6.6 | 8.2 |

DIAGNOSTIC APPARATUS FOR AN EVAPORATED FUEL SYSTEM, AND VEHICLE CONTROL APPARATUS FOR A VEHICLE EQUIPPED WITH THE DIAGNOSTIC APPARATUS

BACKGROUND OF THE INVENTION

1. Field of the Invention

The present invention relates to a diagnostic apparatus for an evaporated fuel system, and relates to a vehicle control apparatus for an automotive vehicle equipped with the diagnostic apparatus. In the evaporated fuel system, fuel vapor, which is evaporated from fuel within a fuel tank, is adsorbed in a canister, and the adsorbed fuel vapor is purged from the canister into an intake passage of an internal combustion engine via a purge passage by using a negative pressure in the intake passage of the engine.

2. Description of the Related Art

As disclosed in Japanese Laid-Open Patent Application No. 9-303214, an evaporated fuel system that is designed to prevent the fuel vapor of a fuel tank from escaping into the atmosphere is known. In the evaporated fuel system, the fuel vapor, which is evaporated from fuel within the fuel tank, is adsorbed in a canister, and the adsorbed fuel vapor is purged, at a proper time, from the canister into an intake passage of an internal combustion engine via a purge passage by using a negative pressure in the intake passage of the engine.

If a leakage-type malfunction, such as pipe disconnection, pipe cracking or fuel tank cracking, occurs in the evaporated fuel system, the fuel vapor will leak from the location of the malfunction. In order to suitably achieve the above-described operation of the evaporated fuel system, it is necessary to safely detect whether the leakage-type malfunction occurs in the evaporated fuel system.

A conceivable diagnostic method for detecting a leakage-type malfunction in the evaporated fuel system is as follows. (1) A negative pressure in the intake passage of the engine is introduced into the evaporated fuel system so as to reduce the pressure in the evaporated fuel system. (2) After the pressure in the evaporated fuel system reaches a reference pressure, the evaporated fuel system is isolated by closing the purge passage. (3) A change in the pressure in the evaporated fuel system after the system is isolated is monitored and the determination as to whether a leakage-type malfunction occurs in the evaporated fuel system is performed based on the monitored pressure change.

When the result of the monitoring is that the pressure of the isolated evaporated fuel system is rapidly increased to the atmospheric pressure, it is determined that a leakage-type malfunction does occur in the evaporated fuel system. On the other hand, when the result of the monitoring is that the change in the pressure of the isolated evaporated fuel system is negligible, it is determined that no leakage-type malfunction occurs in the evaporated fuel system. Hence, by using the above diagnostic method, it is possible to determine whether the leakage-type malfunction occurs in the evaporated fuel system.

However, when the negative pressure in the intake passage of the engine is not sufficiently large to reduce the pressure in the evaporated fuel system, the internal pressure of the evaporated fuel system is not smoothly reduced. In such a case, the internal pressure of the evaporated fuel system may not reach the reference pressure, or much time is needed for the pressure in the evaporated fuel system to reach the reference pressure. During the period for which the negative pressure in the intake passage of the engine is being introduced into the evaporated fuel system, the adsorbed fuel vapor cannot be properly purged from the canister into the intake passage via the purge passage. Therefore, when the above diagnostic method is executed under the condition in which the negative pressure in the intake passage is not sufficiently large, the evaporated fuel system is placed in the non-purging condition for a considerably long time. This will result in the deterioration of the evaporative emission of the engine.

To eliminate the above problem, in the evaporated fuel system disclosed in Japanese Laid-Open Patent Application No. 9-303214, when the negative pressure in the intake passage of the engine is not sufficient large to reduce the internal pressure of the evaporated fuel system, or when the elapsed time needed for the pressure in the evaporated fuel system to reach the reference pressure is longer than a predetermined time, the execution of the above diagnostic method is inhibited or terminated. However, the execution of the diagnostic method according to the above-mentioned document is always inhibited or terminated when the negative pressure in the intake passage is not sufficiently large.

Further, there is no teaching in the above-mentioned document of positively maintaining the negative pressure of the intake passage that is sufficiently large in magnitude to reduce the internal pressure of the evaporated fuel system, when introducing the negative pressure of the intake passage into the evaporated fuel system to reduce the system pressure. If the negative pressure of the intake passage that is sufficient large in magnitude can be maintained when introducing the negative pressure of the intake passage into the evaporated fuel system, it is possible to avoid the undesired condition in which the evaporated fuel system is placed in the non-purging condition for a considerably long time, without inhibiting or terminating the execution of the diagnostic method.

SUMMARY OF THE INVENTION

In order to overcome the above-described problems, preferred embodiments of the present invention provide an improved evaporated fuel system diagnostic apparatus which is capable of maintaining the negative pressure of the intake passage that is sufficiently large in magnitude to reduce the internal pressure of the evaporated fuel system to a reference pressure, when introducing the negative pressure of the intake passage into the evaporated fuel system.

Another object of the present invention is to provide a vehicle control apparatus for an automotive vehicle equipped with the evaporated fuel system diagnostic apparatus which maintains the negative pressure in the intake passage that is sufficiently large in magnitude to reduce the internal pressure of the evaporated fuel system to a reference pressure, when introducing the negative pressure of the intake passage into the evaporated fuel system.

According to one preferred embodiment of the present invention, an evaporated fuel system diagnostic apparatus includes: a malfunction determination unit which determines whether a malfunction in the evaporated fuel system occurs, by introducing a negative pressure of an intake passage of an internal combustion engine into a fuel tank; and an operating condition setting unit which sets, when the malfunction determination unit has started the introduction of the negative pressure of the intake passage into the fuel tank, an operating condition of the engine in a predetermined condition that causes the negative pressure of the intake passage to be within a predetermined pressure range.

In the evaporated fuel system diagnostic apparatus of the above preferred embodiment, the operating condition of the engine is set, when introducing the negative pressure of the intake passage into the evaporated fuel system, in the predetermined condition that causes the negative pressure of the intake passage to be within the predetermined pressure range. As the engine operating condition is set in the predetermined condition, the setting of the throttle valve at a large opening angle is avoided, regardless of whether a heavy load on the engine is demanded by the vehicle operator.

According to one preferred embodiment of the present invention, a diagnostic apparatus for an evaporated fuel system in which fuel vapor, evaporated from fuel within a fuel tank, is adsorbed, and the adsorbed fuel vapor is purged into an intake passage of an internal combustion engine via a purge passage by using a negative pressure of the intake passage, includes: a malfunction determination unit which determines whether a malfunction in the evaporated fuel system occurs, based on an internal pressure in the evaporated fuel system after the evaporated fuel system pressure reaches a reference pressure by introduction of the negative pressure of the intake passage into the fuel tank; and an upper-limit changing unit which changes, when the malfunction determination unit performs the determination regarding the malfunction, an upper-limit value of an opening angle for a throttle valve to a second upper-limit value that is smaller than a first upper-limit value of the throttle valve opening angle used when the malfunction determination unit does not perform the determination.

In the evaporated fuel system diagnostic apparatus of the above preferred embodiment, the upper-limit value of the opening angle for the throttle valve is changed, when introducing the negative pressure of the intake passage into the evaporated fuel system, to a second upper-limit value that is smaller than the first upper-limit value used for the throttle valve in a normal operating condition. As the upper-limit value of the throttle opening angle is changed to a smaller value, the setting of the throttle valve at a large opening angle is avoided, regardless of whether a heavy load on the engine is demanded by the vehicle operator.

According to one preferred embodiment of the present invention, a diagnostic apparatus for an evaporated fuel system in which fuel vapor, evaporated from fuel within a fuel tank, is adsorbed, and the adsorbed fuel vapor is purged into an intake passage of an internal combustion engine via a purge passage by using a negative pressure of the intake passage, includes: a malfunction determination unit which determines whether a malfunction occurs in the evaporated fuel system, based on an internal pressure in the evaporated fuel system after the evaporated fuel system pressure reaches a reference pressure by introduction of the negative pressure of the intake passage into the fuel tank; a pressure introduction unit which introduces the negative pressure of the intake passage into the fuel tank to cause the evaporated fuel system pressure to reach the reference pressure; and a time counting unit which determines an elapsed time from a start of the introduction of the negative pressure, during which an internal pressure in the intake passage is less than a threshold value, wherein the malfunction determination unit determines whether the evaporated fuel system pressure reaches the reference pressure, based on whether the elapsed time, determined by the time counting unit, reaches a reference time.

According to one preferred embodiment of the present invention, a diagnostic apparatus for an evaporated fuel system in which fuel vapor, evaporated from fuel within a fuel tank, is adsorbed, and the adsorbed fuel vapor is purged into an intake passage of an internal combustion engine via a purge passage by using a negative pressure of the intake passage, includes: a malfunction determination unit which determines whether a malfunction occurs in the evaporated fuel system, based on an internal pressure in the evaporated fuel system after the evaporated fuel system pressure reaches a reference pressure by introduction of the negative pressure of the intake passage into the fuel tank; and a pressure introduction unit which introduces the negative pressure of the intake passage into the fuel tank to cause the evaporated fuel system pressure to reach the reference pressure, wherein the malfunction determination unit determines whether the evaporated fuel system pressure reaches the reference pressure, based on whether an elapsed time, counted from a start of the introduction of the negative pressure, reaches a reference time, and interrupts, when an internal pressure in the intake passage after the start of the introduction of the negative pressure exceeds a threshold value, the counting of the elapsed time.

According to one preferred embodiment of the present invention, a diagnostic apparatus for an evaporated fuel system in which fuel vapor, evaporated from fuel within a fuel tank, is adsorbed, and the adsorbed fuel vapor is purged into an intake passage of an internal combustion engine via a purge passage by using a negative pressure of the intake passage, includes: a malfunction determination unit which determines whether a malfunction occurs in the evaporated fuel system, based on an internal pressure in the evaporated fuel system after the evaporated fuel system pressure reaches a reference pressure by introduction of the negative pressure of the intake passage into the fuel tank; a pressure introduction unit which introduces the negative pressure of the intake passage into the fuel tank to cause the evaporated fuel system pressure to reach the reference pressure, wherein the malfunction determination unit determines whether the evaporated fuel system pressure reaches the reference pressure, based on whether a total of a flow rate of the purged fuel vapor counted from a start of the introduction of the negative pressure reaches a reference count, and resets, when an internal pressure in the intake passage after the start of the introduction of the negative pressure exceeds a threshold value, the total of the flow rate to zero.

According to one preferred embodiment of the present invention, a diagnostic apparatus for an evaporated fuel system of an automotive vehicle equipped with an internal combustion engine and a secondary power source includes: a malfunction determination unit which determines whether a malfunction occurs in the evaporated fuel system, by introduction of a negative pressure of an intake passage of the engine into a fuel tank; an operating condition setting unit which sets, when the malfunction determination unit has started the introduction of the negative pressure of the intake passage into the fuel tank, an operating condition of the engine in a predetermined condition that causes the negative pressure of the intake passage to be within a predetermined pressure range; and an output force changing unit which increases, when the operating condition setting unit has set the operating condition of the engine in the predetermined condition, an output force of the secondary power source by an amount corresponding to a decrease of an engine output force calculated with respect to the engine operating condition that is set in the predetermined condition.

It is possible for the evaporated fuel system diagnostic apparatus of the present invention to maintain the negative pressure of the intake passage that is sufficiently large to reduce the internal pressure of the evaporated fuel system. The evaporated fuel system diagnostic apparatus of the present invention is effective in quickly reducing the pressure in the evaporated fuel system to the reference pressure for the determination of the occurrence of a malfunction in the evaporated fuel system.

Further, according to one preferred embodiment of the present invention, a vehicle control apparatus for an automotive vehicle equipped with an internal combustion engine, a secondary power source, an evaporated fuel system and an evaporated fuel system diagnostic apparatus, wherein the evaporated fuel system diagnostic apparatus includes: a malfunction determination unit which determines whether a malfunction in the evaporated fuel system occurs, based on an internal pressure produced in the evaporated fuel system after a reference pressure is reached by the evaporated fuel system pressure by introduction of a negative pressure of an intake passage of the engine into a fuel tank; and an upper-limit changing unit which changes, when the malfunction determination unit performs the determination regarding the malfunction, an upper-limit value of an opening angle for a throttle valve to a second upper-limit value that is smaller than a first upper-limit value of the throttle valve opening angle used when the malfunction determination unit does not perform the determination, and the vehicle control apparatus includes an output force changing unit which increases, when an output force of the engine is decreased after the upper-limit changing unit changes the upper-limit value of the throttle valve opening angle to the second upper-limit value, an output force of the secondary power source by an amount corresponding to the decrease of the engine output force.

In the vehicle control apparatus of the above preferred embodiment, the output force of the secondary power source is increased by the amount corresponding to the decrease of the engine output force after the upper-limit value of the throttle valve opening angle is changed to the second upper-limit value. The vehicle control apparatus of the above preferred embodiment is effective in avoiding the lowering of the total output force of the vehicle even when the upper-limit value of the throttle opening angle is changed to a smaller value at the time of the malfunction determination.

BRIEF DESCRIPTION OF THE DRAWINGS

Other objects, features and advantages of the present invention will become apparent from the following detailed description when read in conjunction with the accompanying drawings in which:

FIG. 9 is a diagram for explaining a map of a second upper-limit value of the throttle opening angle determined based on a relationship between the engine speed and the atmospheric pressure.

DETAILED DESCRIPTION OF PREFERRED EMBODIMENTS

A description will now be provided of preferred embodiments of the present invention with reference to the accompanying drawings.

Figure 1:
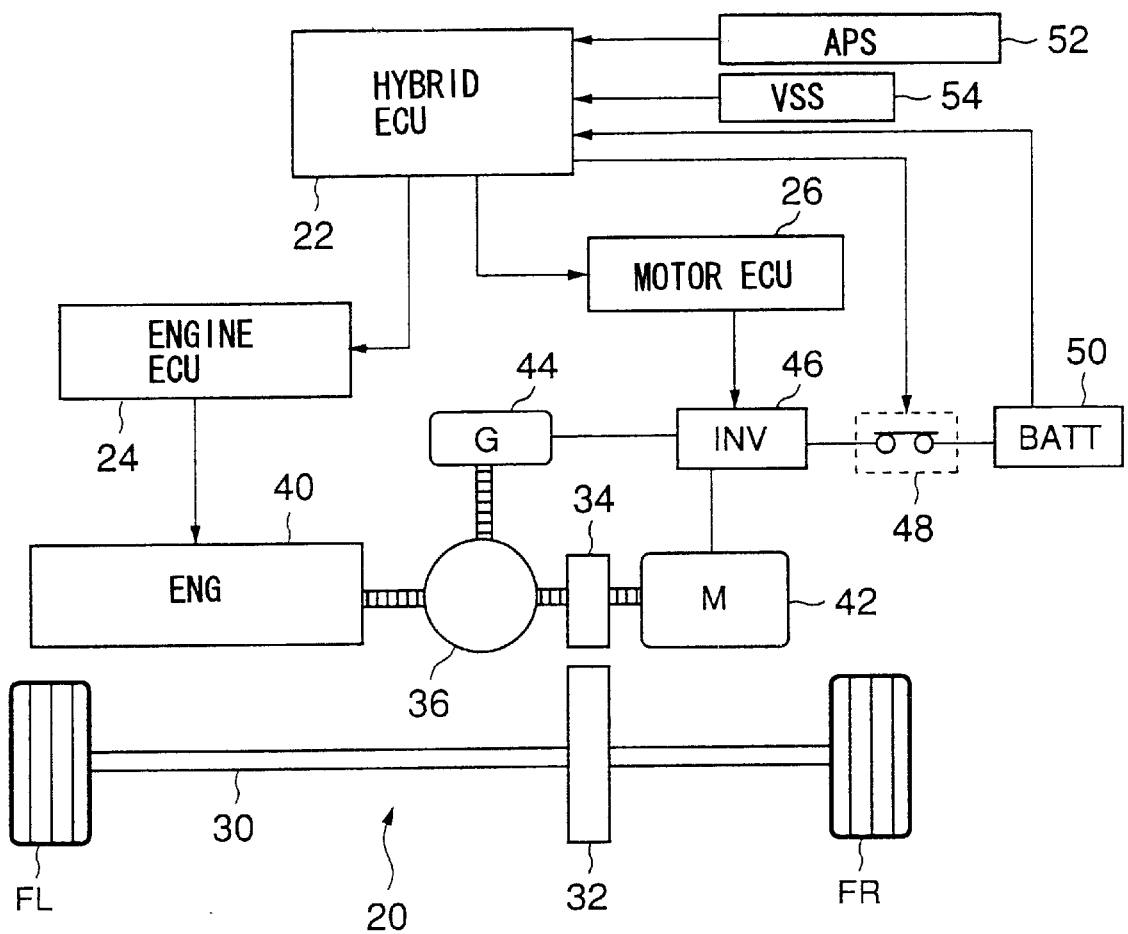
FIG. 1 is a diagram of a powertrain of an automotive vehicle on which one embodiment of the evaporated fuel system diagnostic apparatus of the invention is mounted.

FIG. 1 shows a powertrain of an automotive vehicle on which one embodiment of the evaporated fuel system diagnostic apparatus of the invention is mounted. In the present embodiment, the automotive vehicle is a hybrid vehicle that is equipped with an internal combustion engine as a main power source and an electric motor as a secondary power source.

As shown in FIG. 1, the vehicle 20 includes a hybrid ECU (electronic control unit) 22, an engine ECU 24 and a motor ECU 26. In the powertrain of the vehicle 20, there is provided an axle 30 that links a front-left wheel ("FL") and a front-right wheel ("FR"). A reduction gear 32 is secured to the axle 30. A planetary gear mechanism 36 is connected through a gear 34 to the reduction gear 32. The planetary gear mechanism 36 includes a planetary carrier connected to the output shaft of an internal combustion engine 40 ("ENG"), a ring gear connected to the output shaft of an electric motor 42 ("M"), and a sun gear connected to the output shaft of a generator 44 ("G").

Both the motor 42 and the generator 44 are connected to an inverter 46 ("INV"), and a battery 50 ("BATT") is connected through a main relay 48 to the inverter 46. The motor ECU 26 is connected to the inverter 46. The hybrid ECU 22 is connected to the main relay 48. The hybrid ECU 22 supplies a drive signal to the main relay 48 so that the main relay 48 is turned ON. When the main relay 48 is turned ON, electrical power from the battery 50 is supplied to the inverter 46 through the main relay 48. The inverter 46 includes a three-phase bridge circuit between the battery 50 and the generator 44 and a three-phase bridge circuit between the battery 50 and the motor 42. In the three-phase bridge circuits of the inverter 46, the direct current is transformed into the three-phase alternating current or vice versa. With respect to the generator 44 and the motor 42, the motor ECU 26 controls the inverter 46 such that the generator 44 and the motor 42 are driven at a revolution speed that is proportional to the frequency of the alternating current supplied by the inverter 46 and the generator 44 and the motor 42 generate an output torque that is proportional to the magnitude of the supplied alternating current.

When the operation of the engine 40 is not started, the electrical power from the battery 50 is supplied to the generator 44 via the inverter 46, and the generator 44 acts as a starter motor that starts the operation of the engine 40. After the starting operation of the engine 40 is completed, the mechanical power from the output shaft of the engine 40 is transformed into electrical power by the inverter 46 and such electrical power is supplied to one of the battery 50 or the motor 42.

Further, when the vehicle 20 is running in a normal condition, the electrical power from the inverter 46 is supplied to the electric motor 42. The motor 42 acts as the secondary power source that generates an auxiliary output power from the electrical power supplied by the inverter 46, in order to help increase the total output force of the vehicle 20. During the braking of the vehicle, the rotation of the axle 30 causes the mechanical power to be produced by the motor 42 and the electrical power derived from the inverter 46 is supplied to the battery 50. The motor 42 acts as an electrical power generator that uses the electrical power supplied by the inverter 46, to put the battery 50 on charge.

The battery 50 is connected to the hybrid ECU 22. The hybrid ECU 22 monitors the charged condition of the battery 50. Specifically, the battery 50 supplies a signal indicative of the available battery capacity to the hybrid ECU 22, and the hybrid ECU 22 detects the available capacity of the battery 50 based on the signal supplied by the battery 50.

Further, in the vehicle 20 of FIG. 1, the engine ECU 24 is connected to the internal combustion engine 40. The engine ECU 24 supplies a drive signal to the engine 40, and the engine 40 generates an output force in accordance with the drive signal supplied by the engine ECU 24.

As described above, in the present embodiment, the vehicle 20 is a hybrid vehicle that is equipped with the internal combustion engine 40 as the main power source and the electric motor 42 as the secondary power source. The hybrid vehicle 20 is propelled by a sum of the output force of the engine 40 and the output force of the motor 42. The sum of the engine output force and the motor output force is determined in accordance with the operating condition of the vehicle 20.

An accelerator pedal position sensor 52 ("APS") is connected to the hybrid ECU 22, and the accelerator pedal position sensor 52 supplies a detection signal indicative of the position of an accelerator pedal depressed by the vehicle operator, to the hybrid ECU 22. The hybrid ECU 22 detects the accelerator pedal position (called the ACCP) based on the detection signal supplied by the accelerator pedal position sensor 52. A vehicle speed sensor 54 ("VSS") is connected to the hybrid ECU 22, and the vehicle speed sensor 54 supplies a pulsed signal indicative of the vehicle speed of the vehicle 20, to the hybrid ECU 22. The pulsed signal has the period that is proportional to the vehicle speed of the vehicle 20. The hybrid ECU 22 detects the vehicle speed (called the SPD) based on the pulsed signal supplied by the vehicle speed sensor 54.

In the hybrid ECU 22, a required output force of the vehicle 20 is calculated based on the detected accelerator pedal position (the ACCP) and the detected vehicle speed (the SPD). After the required vehicle output force is calculated, the hybrid ECU 22 determines a required output force (called the $W_E$) of the engine 40 depending on the required vehicle output force, and determines a required output force (called the $W_M$) of the motor 42 depending on the required vehicle output force. In the vehicle 20 of FIG. 1, the hybrid ECU 22 is connected to each of the engine ECU 24 and the motor ECU 26. The hybrid ECU 22 supplies a control signal to the engine ECU 24 so that the engine ECU 24 instructs the engine 40 to generate the required output force $W_E$, and simultaneously supplies a control signal to the motor ECU 26 so that the motor ECU 26 instructs the motor 42 to generates the required output force $W_M$. Hence, the vehicle 20 is propelled by the sum of the required output force $W_E$ of the engine 40 and the required output force $W_M$ of the motor 42.

Figure 2:
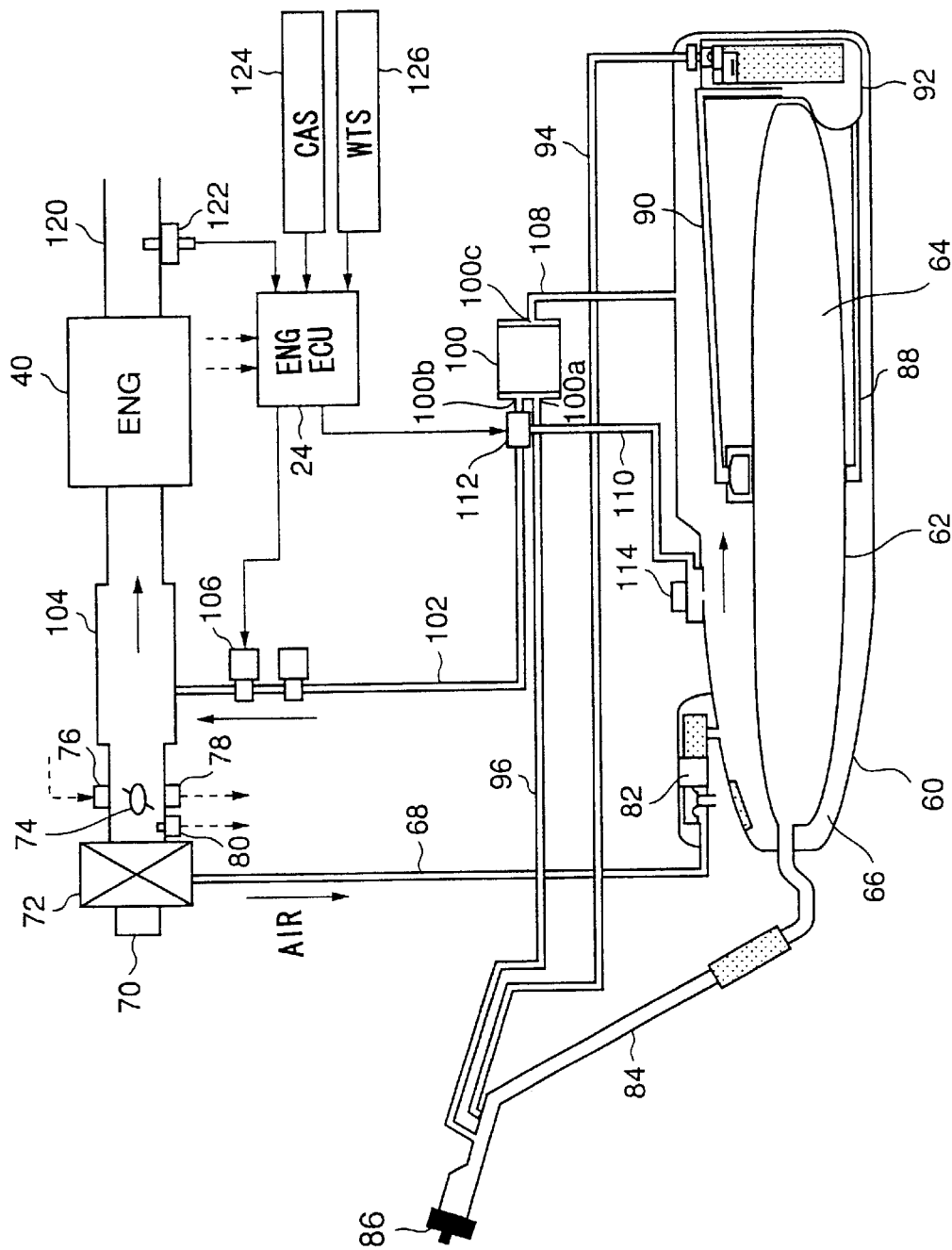
FIG. 2 is a diagram of an evaporated fuel system to which the evaporated fuel system diagnostic apparatus of the present embodiment is applied.

FIG. 2 shows an evaporated fuel system in the vehicle of FIG. 1 to which the evaporated fuel system diagnostic apparatus of the present embodiment is applied.

As shown in FIG. 2, in the evaporated fuel system of the present embodiment, a fuel tank 60 is provided. The fuel tank 60 is covered with an external iron casing. The fuel tank 60 includes a bladder 62 provided within the fuel tank 60. The internal space of the fuel tank 60 is divided by the bladder 62 into a fuel chamber 64 and a vapor chamber 66. In the fuel tank 60, fuel is contained in the fuel chamber 64, and the vapor chamber 66 is filled with fuel vapor that is evaporated from the fuel within the fuel tank 60. The bladder 62 is made of an expandable resin material, and the fuel chamber 64 is expandable in volume according to the amount of fuel contained in the fuel tank 60.

In the evaporated fuel system of FIG. 2, an air introducing pipe 68 is extended from an air cleaner 72, which is provided in an intake passage 70 of the engine 40, and the air introducing pipe 68 is connected to the fuel tank 60. The air cleaner 72 serves to filter the intake air that enters the engine 40 through the intake passage 70. At a downstream position of the air cleaner 72 in the intake passage 70, a throttle valve 74 is provided. A throttle actuator 76 is connected to the throttle valve 74. The throttle actuator 76 is connected with the engine ECU 24. The engine ECU 24 supplies a drive signal to the throttle actuator 76 so that the throttle valve 74 is placed at a desired throttle opening angle by the throttle actuator 76 in accordance with the drive signal supplied by the engine ECU 24.

A throttle position sensor 78 is provided on the intake passage 70 near the throttle valve 74. The throttle position sensor 78 is connected with the engine ECU 24. The throttle position sensor 78 supplies a signal indicative of a throttle opening angle (call the TA) of the throttle valve 74, to the engine ECU 24. The engine ECU 24 detects the throttle opening angle (the TA) of the throttle valve 74 based on the signal supplied by the throttle position sensor 78.

An air flow meter 80 is provided on the intake passage 70 at an intermediate position between the air cleaner 72 and the throttle valve 74. The air flow meter 80 is connected with the engine ECU 24. The air flow meter 80 supplies a signal indicative of a flow rate (or the mass of the air flowing per unit time) of the intake air that passes through the air cleaner 72, to the engine ECU 24. The engine ECU 24 detects the intake air flow rate (called the Ga) based on the signal supplied by the air flow meter 80.

A canister closed valve (CCV) 82 is provided at an end of the air introducing pipe 68 where the pipe 68 is connected into the vapor chamber 66 of the fuel tank 60. The CCV 82 is connected with the engine ECU 24. The CCV 82 in the present embodiment is a two-position solenoid valve that is set in a valve-open position when the engine ECU 24 supplies no drive signal to the CCV 82, and set in a valve-closed position when the engine ECU 24 supplies a drive signal to the CCV 82. When the CCV 82 is set in the valve-open position, the vapor chamber 66 of the fuel tank 60 is communicated with the atmosphere by the air introducing pipe 68 via the intake passage 70 and the air cleaner 72.

A filler pipe 84 is connected into the fuel chamber 64 of the fuel tank 60. When the fuel tank 60 is refilled with fuel, the fuel is delivered through the filler pipe 84 into the fuel chamber 64 of the fuel tank 60. A fuel cap 86 is detachably mounted to an air inlet end of the filer pipe 84. In the fuel tank 60, a lower fuel passage 88 is connected at one end to the middle position on the bottom of the fuel chamber 64, and an upper fuel passage 90 is connected at one end to the middle position on the top of the fuel chamber 64. A sub-tank 92 having a fixed volume is provided within the fuel tank 60. The lower fuel passage 88 and the upper fuel passage 90 are connected at the other ends to the sub-tank 92. A fuel pump (not shown) is built in the sub-tank 92. Fuel that is sucked up from the fuel tank 60 by the fuel pump is subjected to pressure adjustment to obtain a given pressure of the fuel, and the fuel under the given pressure is then supplied through a fuel supply pipe (not shown) to a fuel injection valve (not shown), which is provided to inject the fuel into the engine 40.

A first vapor exhaust passage 94 is connected at one end to an upper end portion of the sub-tank 92, and connected at the other end to the filler pipe 84. The first vapor exhaust passage 94 is provided to discharge the fuel vapor that is evaporated from the fuel within the fuel chamber 64 or the sub-tank 92 in the fuel tank 60. The fuel vapor, which is supplied through the first vapor exhaust passage 94 to the filler pipe 84, is partially liquefied into the fuel by contact with the inner wall of the filler pipe 84, and the resulting fuel is returned to the fuel chamber 64 of the fuel tank 60.

A second vapor exhaust passage 96 is further connected at one end to the filler pipe 84. The second vapor exhaust passage 96 is provided to discharge the fuel vapor, which is evaporated from the fuel within the fuel chamber 64 or the sub-tank 92 or directly enters the filler pipe 84 from the fuel chamber 64. A canister 100 is provided at the other end of the second vapor exhaust passage 96, and the second vapor exhaust passage 96 is connected into a vapor inlet hole 100a of the canister 100. The canister 100 contains an adsorbent, such as activated carbon, which adsorbs the fuel vapor supplied from the fuel tank 60 via the second vapor exhaust passage 96.

The canister 100 includes a vapor outlet hole 100b which is provided on the same side of the canister 100 as the vapor inlet hole 100a. A purge passage 102 is connected at one end to the vapor outlet hole 100b of the canister 100. The purge passage 102 is connected at the other end to an intake manifold 104, which is provided in the intake passage 70. The purge passage 102 is a passage provided between the canister 100 and the intake passage 70 to purge the adsorbed fuel vapor from the canister 100 into the intake passage 70 of the engine 40.

A purge control valve 106 is provided at an intermediate portion of the purge passage 102. The purge control valve 106 in the present embodiment is a solenoid-type vacuum switching valve (VSV), which is connected with the engine ECU 24. The purge control valve 106 is set in a valve-closed position when the engine ECU 24 supplies no drive signal to the valve 106, and set in a valve-open position when the engine ECU 24 supplies a drive signal to the valve 106.

The drive signal sent by the engine ECU 24 to the purge control valve 106 is indicative of a duty factor that defines the ratio of an on-state time within a duty cycle to a total duty-cycle time for the purge control valve 106. The purge control valve 106 is set in the valve-open position only during the on-state time of the duty factor of the drive signal supplied by the engine ECU 24, and, only during the on-state time, the fuel vapor from the canister 100 is purged into the intake passage 102 via the purge passage 102. The engine ECU 24 controls the switching of the purge control valve 106 such that the flow rate of the fuel vapor, delivered from the canister 100 into the intake passage 70, is maintained at a predetermined level.

The canister 100 further includes an air inlet hole 100c, which is provided on the opposite side of the canister 100 to the vapor inlet hole 100a. A first vapor passage 108 is connected at one end to the air inlet hole 100c of the canister 100. The first vapor passage 108 is connected at the other end to the vapor chamber 66 of the fuel tank 60. In the evaporated fuel system of the present embodiment, the vapor chamber 66 and the intake passage 70 (the intake manifold 104) are communicated together through the first vapor passage 108, the canister 100 and the purge passage 102.

A second vapor passage 110 is connected at one end to the vapor chamber 66 of the fuel tank 60. The second vapor passage 110 is connected at the other end to the purge passage 102. In the evaporated fuel system of the present embodiment, the vapor chamber 66 and the intake passage 70 (the intake manifold 104) are communicated together through the second vapor passage 110 and the purge passage 102, which is a bypass passage going around the canister 100 rather than passing through the canister 100. Hereinafter, the second vapor passage 110 will be called the bypass passage 110. In the present embodiment, the bypass passage 110 is provided such that it has a volume that is much smaller than the volume of the vapor chamber 66 of the fuel tank 60.

At a connection position between the purge passage 102 and the second vapor passage 110, a bypass control valve 112 is provided. The bypass control valve 112 in the present embodiment is a solenoid-type vacuum switching valve (VSV), which is connected with the engine ECU 24. The bypass control valve 112 is set in a first position when the engine ECU 24 supplies no drive signal to the valve 112, and set in a second position when the engine ECU 24 supplies a drive signal to the valve 112. When the bypass control valve 112 is set in the first position, the canister 100 and the first vapor passage 108 are open to the purge passage 102 through the valve 112 and the bypass passage 110 is closed by the valve 112. On the other hand, when the bypass control valve 112 is set in the second position, the canister 100 and the first vapor passage 108 are closed by the valve 112, and the bypass passage 110 is open to the purge passage 102 through the valve 112.

A tank pressure sensor 114 is provided in the vapor chamber 66 of the fuel tank 60 at the end of the bypass passage 110. The tank pressure sensor 114 is connected with the engine ECU 24. The tank pressure sensor 114 supplies a detection signal indicative of the internal pressure (called the tank pressure P) of the bypass passage 110 and the vapor chamber 66, to the engine ECU 24. The engine ECU 24 detects the tank pressure P based on the detection signal supplied by the tank pressure sensor 114.

An $O_2$ sensor 122 is provided on an exhaust passage 120 of the engine 40. The $O_2$ sensor 122 is connected with the engine ECU 24. The $O_2$ sensor 122 supplies a signal indicative of the concentration of oxygen gas in the exhaust gas flowing through the exhaust passage 120, to the engine ECU 24. The concentration of oxygen gas in the exhaust gas becomes small when the mixture, supplied to the combustion chamber of the engine 40, is rich (or when the air-fuel ratio of the mixture is larger than the stoichiometric ratio), and it becomes large when the mixture is lean (or when the air-fuel ratio of the mixture is smaller than the stoichiometric ratio). Specifically, the $O_2$ sensor 122 supplies a high-level signal (about 0.9 V) to the engine ECU 24 when the mixture is rich, and supplies a low-level signal (about 0.1 V) to the engine ECU 24 when the mixture is lean. The engine ECU 24 detects whether the mixture, supplied to the engine 40, is rich or lean, based on the signal supplied by the $O_2$ sensor 122.

A crank angle sensor 124 ("CAS") is connected with the engine ECU 24. The crank angle sensor 124 supplies a reference signal to the engine ECU 24 every time the rotation angle of the crankshaft of the engine 40 reaches a predetermined angle. The engine ECU 24 detects the engine speed (called the NE) of the engine 40 based on the signal supplied by the crank angle sensor 124.

A water temperature sensor 126 ("WTS") is connected with the engine ECU 24. The water temperature sensor 126 supplies a detection signal indicative of the temperature (called the THW) of the cooling water of the engine 40, to the engine ECU 24. The engine ECU 24 detects the temperature THW of the cooling water of the engine 40 based on the signal supplied by the water temperature sensor 126.

Next, a description will be given of the evaporated fuel system diagnostic apparatus of the present embodiment for the above-described evaporated fuel system.

The above-described evaporated fuel system is designed to prevent the fuel vapor of the fuel tank 60 from escaping into the atmosphere. In the evaporated fuel system, the fuel vapor, which is evaporated from the fuel within the fuel tank 60, is adsorbed in the canister 100, and the adsorbed fuel vapor is purged, at a proper time, from the canister 100 into the intake passage 70 (or the intake manifold 104) via the purge passage 102 by using a negative pressure in the intake passage 70 of the engine 40.

The fuel vapor, which is evaporated from the fuel in the fuel chamber 64 and the sub-tank 92, is delivered to the canister 100 through the first and second vapor exhaust passages 94 and 96. The fuel vapor is adsorbed in the canister 100.

When the engine 40 is running, the intake manifold 104, which is located at the downstream portion of the throttle valve 74 in the intake passage 70, is in a negative pressure. If the purge control valve 106 is set in the valve-open position under such a condition, then the adsorbed fuel vapor from the canister 100 is purged into the intake passage 70 (or the intake manifold 104) via the purge passage 102 by using the negative pressure of the intake passage 70. The fuel vapor, which enters the intake manifold 104, is delivered, together with the intake air, to the engine 40. Hence, the evaporated fuel system can prevent the fuel vapor of the fuel tank 60 from escaping into the atmosphere.

When the fuel vapor is not purged from the canister 100 into the intake passage 70, the engine ECU 24 determines a fuel injection time TAU for the fuel injection valve based on the detected intake air flow rate Ga, such that the air-fuel ratio of the mixture, supplied to the combustion chamber of the engine 40, is set at a predetermined level (the stoichiometric ratio). In the present case, the air-fuel ratio of the mixture is maintained in the vicinity of the stoichiometric ratio by the control of the engine ECU 24, which provides appropriate exhaust emission of the engine 40.

When the fuel vapor is purged from the canister 100 into the intake passage 70, the amount of fuel in the mixture supplied to the combustion chamber of the engine becomes excessive by the amount of the purged fuel vapor. If the engine ECU 24 determines the fuel injection time TAU based on the detected intake air flow rate Ga in the same manner as in the above-mentioned case, the mixture supplied to the combustion chamber of the engine 40 becomes rich. In the present case, the fuel injection time TAU is corrected by using a feedback process, such that the actual fuel injection time is equal to the stoichiometric ratio. Namely, the fuel injection time TAU is reduced by a time corresponding to the amount of the purged fuel vapor. Hence, in the present case, the control of the engine ECU 24 provides appropriate exhaust emission of the engine 40 as well.

If a leakage-type malfunction, such as pipe disconnection, pipe cracking or fuel tank cracking, occurs in the evaporated fuel system, the fuel vapor will leak from the location of the malfunction. In order to suitably achieve the above-described operation of the evaporated fuel system, it is necessary that the evaporated fuel system diagnostic apparatus safely detect whether a leakage-type malfunction occurs in the evaporated fuel system.

In the evaporated fuel system diagnostic apparatus of the present embodiment, as soon as the conditions for starting the execution of the malfunction determination procedure are met, the canister closed valve 82 is set in the-valve-closed position. At this time, the intake air, sent from the intake passage 70 to the fuel tank 60 via the air introducing pipe 68, is prevented from entering the vapor chamber 66 by the canister closed valve 82 in the valve-closed position. The internal pressure of the evaporated fuel system is reduced by the negative pressure of the intake passage 70, and reaches a reference pressure. After the reference pressure is reached, the purge control valve 106 is set in the valve-closed position to close the purge passage 102. At this time, both the valves 82 and 106 are set in the valve-closed position, and the evaporated fuel system is isolated.

When no leakage-type malfunction occurs in the evaporated fuel system, the internal pressure of the evaporated fuel system is gradually increased as the fuel within the system is increasingly evaporated into the fuel vapor. When a leakage-type malfunction occurs in the evaporated fuel system, the internal pressure of the evaporated fuel system is rapidly increased to the atmospheric pressure as the fuel vapor is increasingly leaking from the location of the malfunction. Therefore, the determination as to whether a leakage-type malfunction occurs in the evaporated fuel system can be performed based on a change of the internal pressure of the evaporated fuel system detected after the system is isolated.

However, there is a case in which a heavy load on the engine 40 is demanded to set the throttle valve 74 at a large opening angle during the time the negative pressure of the intake passage 70 is introduced into the evaporated fuel system to reduce the internal pressure of the system. If the throttle valve 74 is set at a large opening angle, the negative pressure in the intake passage 70 of the engine 40 is not sufficiently large to reduce the internal pressure of the evaporated fuel system. In such a case, the internal pressure of the evaporated fuel system may not reach the reference pressure, or much time is needed for the internal pressure of the evaporated fuel system to reach the reference pressure.

In the evaporated fuel system diagnostic apparatus of the present embodiment, the upper-limit value of the opening angle for the throttle valve 74 is changed, when introducing the negative pressure of the intake passage 70 into the evaporated fuel system, to a second upper-limit value that is smaller than a first upper-limit value used for the throttle valve 74 in a normal operating condition. As the upper-limit value of the throttle opening angle is changed to a smaller value, the setting of the throttle valve 74 at a large opening angle is avoided. It is possible for the evaporated fuel system diagnostic apparatus of the present embodiment to maintain the negative pressure of the intake passage 70 that is sufficiently large to reduce the internal pressure of the evaporated fuel system.

Figure 3:
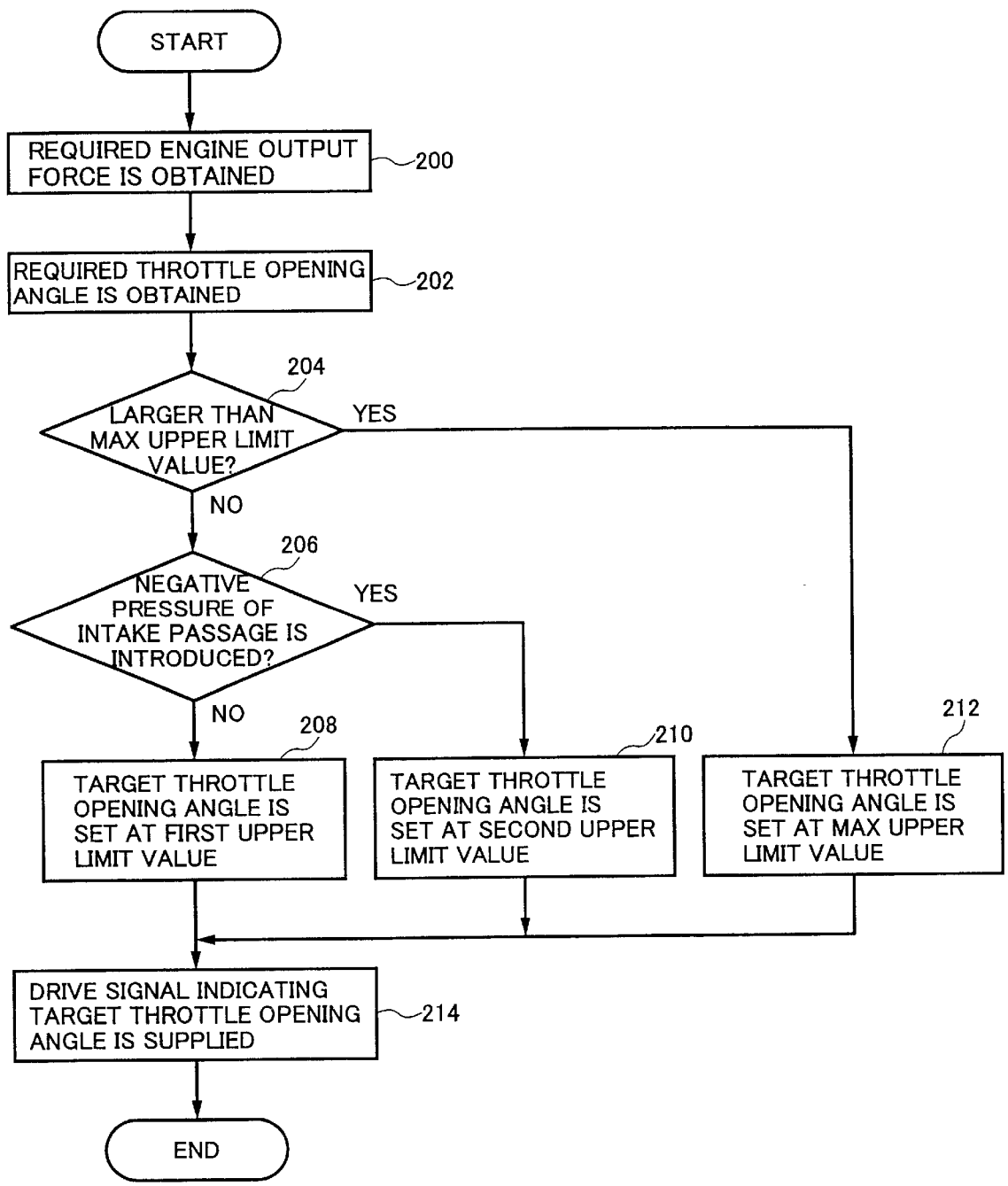
FIG. 3 is a flowchart for explaining a malfunction determination control routine executed by an engine ECU in a first preferred embodiment of the evaporated fuel system diagnostic apparatus of the invention.

FIG. 3 shows a malfunction determination control routine executed by the engine ECU in a first preferred embodiment of the evaporated fuel system diagnostic apparatus of the invention.

The execution of the malfunction determination control routine of FIG. 3 is repeatedly started by the engine ECU 24 each time the control routine is terminated.

As shown in FIG. 3, at a start of the malfunction determination control routine, the engine ECU 24 at step 200 determines a required output force $W_E$ of the engine 40 from the control signal supplied by the hybrid ECU 22.

The engine ECU 24 at step 202 determines a required throttle opening angle based on a relationship between the required engine output force $W_E$, obtained in the step 200, and the current engine speed NE, detected from the signal supplied by the crank angle sensor 124.

Figure 4:
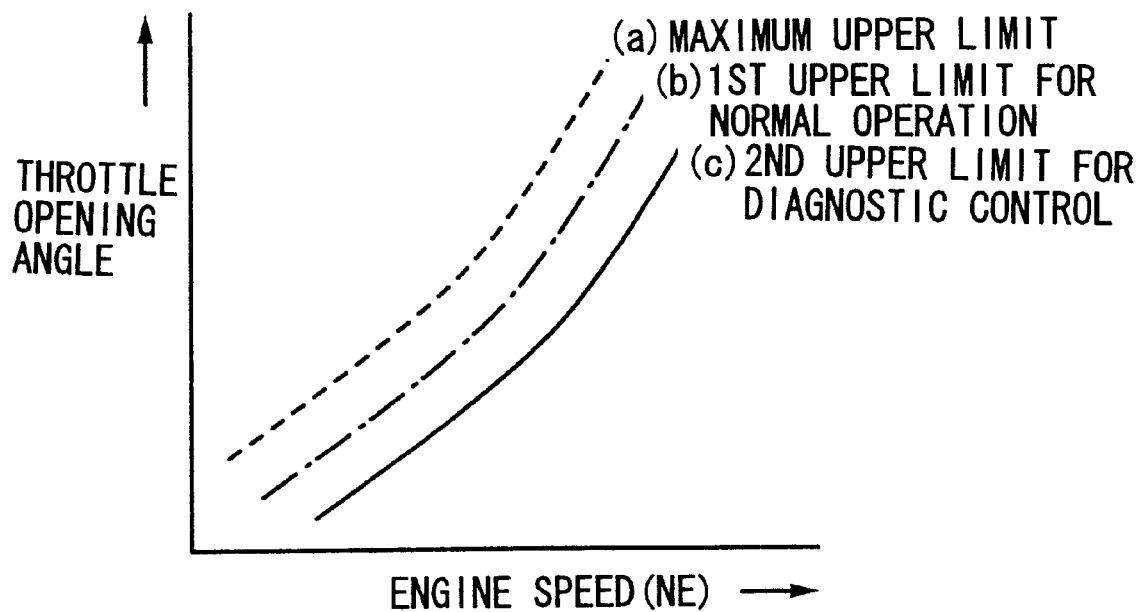
FIG. 4 is a diagram for explaining a relationship between the engine speed and the upper-limit of the throttle opening angle.

FIG. 4 shows a relationship between the engine speed (NE) of the engine 40 and the upper-limit value of the throttle opening angle for the throttle valve 74. In FIG. 4: a maximum permissible upper-limit value of the opening angle for the throttle valve 74 obtained in view of the performance of the engine 40 of the hybrid vehicle 20 is indicated by the dotted line (a); a first upper-limit value of the opening angle for the throttle valve 74 used for the normal operation of the engine 40 is indicated by the one-dot chain line (b); and a second upper-limit value of the opening angle for the throttle valve 74 used for the malfunction determination control is indicated by a solid line (c).

As shown in FIG. 4, the second upper-limit value indicated by the solid line (c) is smaller than the first upper-limit value indicated by the one-dot chain line (b), and the first upper-limit value indicated by the one-dot chain line (b) is smaller than the maximum permissible upper-limit value indicated by the dotted line (a). In the present embodiment, the first upper-limit value (b) of the throttle opening angle used for the normal operation of the engine 40 is predetermined such that the setting of the throttle valve 74 at the first upper-limit value results in the negative pressure of the intake passage 70 which is about −50 mmHg. Further, the second upper-limit value (c) of the throttle opening angle used for the malfunction determination control is predetermined such that the setting of the throttle valve 74 at the second upper-limit value results in the negative pressure of the intake passage 70 which is about −100 mmHg.

In the control routine of FIG. 3, the engine ECU 24 at step 204 determines whether the required throttle opening angle, obtained in the step 202, is larger than the maximum permissible upper-limit value indicated by the dotted line (a) in FIG. 4.

When the result at the step 204 is affirmative, it is determined that a rapid acceleration of the hybrid vehicle 20, rather than the execution of the malfunction determination control, is currently demanded by the vehicle operator. The control of the engine ECU 24 in this case is transferred to step 212. The engine ECU 24 at step 212 sets a target throttle opening angle at the maximum upper-limit value (indicated by the dotted line (a) in FIG. 4) that is determined from the engine speed NE. After the step 212 is performed, the control of the engine ECU 24 in this case is transferred to step 214, which will be described later.

When the result at the step 204 is negative, it is determined that a rapid acceleration of the hybrid vehicle 20 is not currently demanded. The control of the engine ECU 24 in this case is transferred to step 206.

The engine ECU 24 at step 206 determines whether the negative pressure of the intake passage 70 is currently introduced into the evaporated fuel system. When the result at the step 206 is negative, it is determined that maintaining the negative pressure of the intake passage 70 that is sufficiently large in magnitude to reduce the internal pressure of the evaporated fuel system is not needed. The control of the engine ECU 24 in this case is transferred to step 208, which will be described later.

On the other hand, when the result at the step 206 is affirmative, it is determined that maintaining the negative pressure of the intake passage 70 that is sufficiently large in magnitude to reduce the internal pressure of the evaporated fuel system to the reference pressure is needed. The control of the engine ECU 24 in this case is transferred to step 210, which will be described later.

The engine ECU 24 at step 208 sets the target throttle opening angle at the first upper-limit value (indicated by the one-dot chain line (b) in FIG. 4) that is determined from the engine speed NE.

The engine ECU 24 at step 210 sets the target throttle opening angle at the second upper-limit value (indicated by the solid line (c) in FIG. 4) that is determined from the engine speed NE.

After one of the steps 208, 210 and 212 is performed, the engine ECU 24 at step 214 supplies a drive signal indicative of the target throttle opening angle to the throttle actuator 76 so that the throttle valve 74 is placed at the target throttle opening angle by the throttle actuator 76 in accordance with the drive signal. After the step 214 is performed, the malfunction determination control routine of FIG. 3 at the present cycle is terminated.

According to the malfunction determination control procedure of the above-described embodiment, the upper-limit value of the opening angle for the throttle valve 74 is changed, when introducing the negative pressure of the intake passage 70 into the evaporated fuel system, to a value that is smaller than the first upper-limit value of the opening angle for the throttle valve 74 used for the normal engine operation. As the upper-limit value of the throttle opening angle is changed to the smaller value, the setting of the throttle valve 74 at a large opening angle is avoided, regardless of whether a heavy load on the engine 40 is demanded by the vehicle operator. It is possible for the evaporated fuel system diagnostic apparatus of the above-described embodiment to maintain the negative pressure of the intake passage 70 that is sufficiently large to reduce the internal pressure of the evaporated fuel system to the reference pressure. The evaporated fuel system diagnostic apparatus of the above-described embodiment is effective in quickly reducing the pressure in the evaporated fuel system to the reference pressure for the determination of the occurrence of a leakage-type malfunction in the evaporated fuel system.

In the above-described control routine of FIG. 3, when the engine ECU 24 at the step 204 determines that a rapid acceleration of the vehicle 20 is currently demanded by the vehicle operator, the engine ECU 24 controls the throttle actuator 76 so that the opening angle of the throttle valve 74 is set at the maximum permissible upper-limit value. When the throttle valve 74 is set at such large opening angle, the negative pressure of the intake passage 70 becomes small in magnitude. In such a case, the internal pressure of the evaporated fuel system may not reach the reference pressure, or much time is needed for the internal pressure of the evaporated fuel system to reach the reference pressure.

In order to eliminate the above problem, the evaporated fuel system diagnostic apparatus of the present embodiment may be configured so that, when the result at the step 204 is affirmative, the malfunction determination control to determine whether a leakage-type malfunction occurs in the evaporated fuel system is terminated without performing the subsequent steps.

In the above-described control routine of FIG. 3, when the engine ECU 24 performs the step 210, the upper-limit value of the opening angle for the throttle valve 74 is changed to a smaller value. In such a case, the amount of the intake air delivered to the engine 40 is decreased, and the output force of the engine 40 is decreased accordingly. Namely, when the engine ECU 24 performs the step 210, the output force of the engine 40 in the hybrid vehicle 20 is decreased by the decrease of the amount of the intake air.

In order to eliminate the above problem, the vehicle control apparatus for the vehicle equipped with the evaporated fuel system diagnostic apparatus of the first preferred embodiment is configured so that, when the upper-limit value of the opening angle for the throttle valve 74 is changed to a smaller value, a decrease of the output force of the engine 40 due to the decrease of the amount of the intake air is calculated, and the output force of the motor 42 is increased by an amount corresponding to the decrease of the engine output force, so that the sum of the engine output force and the motor output force is maintained at a level that meets the required output force of the vehicle 20.

Figure 5:
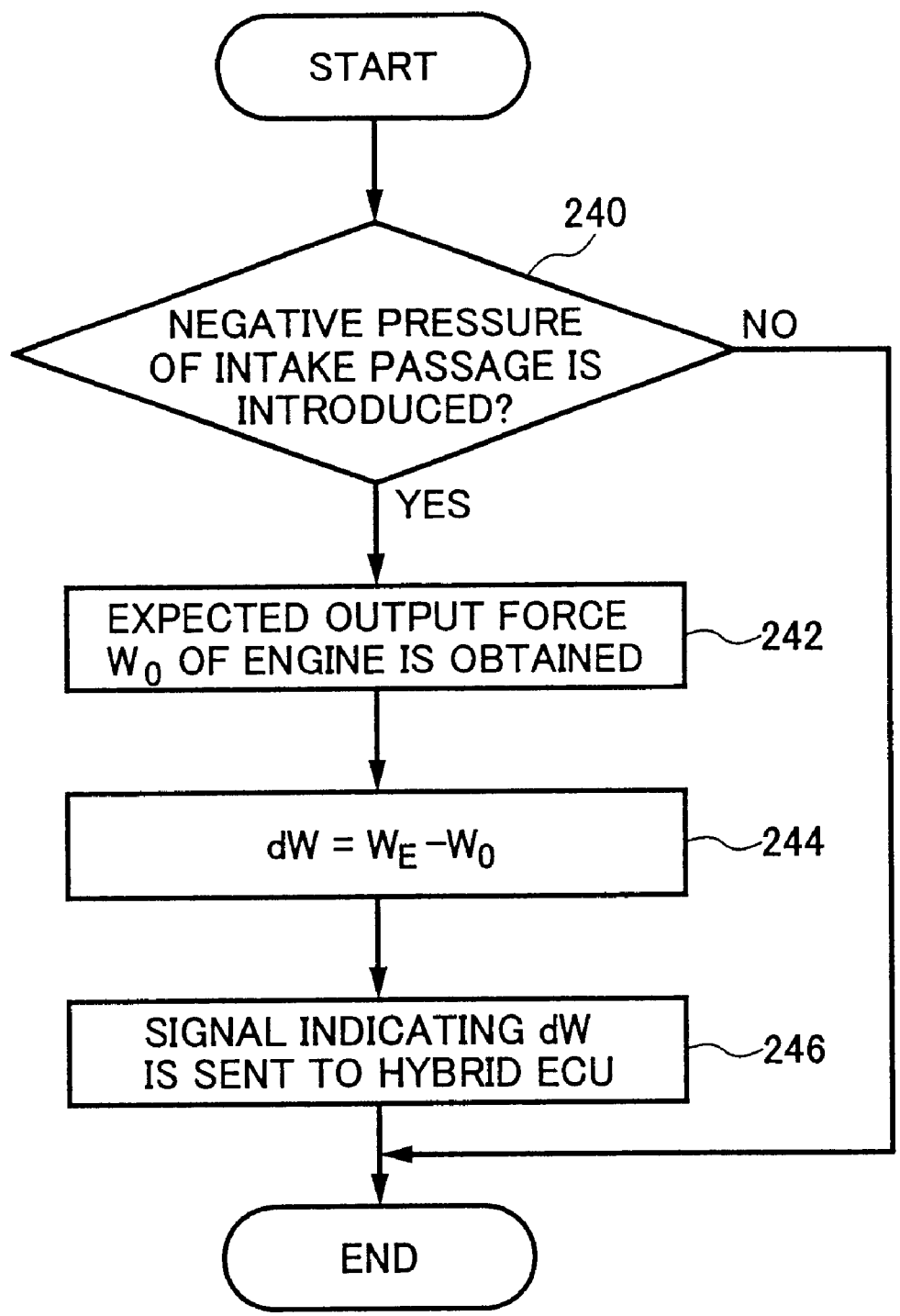
FIG. 5 is a flowchart for explaining a vehicle control routine executed by the engine ECU in the first preferred embodiment.

FIG. 5 shows a vehicle control routine executed by the engine ECU in the first preferred embodiment.

The vehicle control routine of the present embodiment is configured so that, when the upper-limit value of the opening angle for the throttle valve 74 is changed to a smaller value, a decrease of the output force of the engine 40 due to the decrease of the amount of the intake air is calculated, and the output force of the motor 42 is increased by an amount corresponding to the decrease of the engine output force.

The execution of the vehicle control routine of FIG. 5 is repeatedly started by the engine ECU 24 each time the vehicle control routine is terminated.

As shown in FIG. 5, at a start of the vehicle control routine, the engine ECU 24 at step 240 determines whether the negative pressure of the intake passage 70 is currently introduced into the evaporated fuel system to reduce the internal pressure of the evaporated fuel system to the reference pressure. The step 240 in the present embodiment is essentially the same as the step 206 in the control routine of FIG. 3.

When the result at the step 240 is negative, it is determined that the performance of the vehicle control routine is not needed. In this case, the vehicle control routine of FIG. 5 at the present cycle is terminated. On the other hand, when the result at the step 240 is affirmative, it is determined that the performance of the vehicle control routine is needed. The control of the engine ECU 24 in this case is transferred to step 242.

The engine ECU 24 at step 242 determines an expected output force $W_O$ of the engine 40, which is produced when the throttle valve 74 is placed at the target throttle opening angle, based on the target throttle opening angle (obtained in the step 210 of FIG. 3) and the engine speed NE (used in the step 210 of FIG. 3).

The engine ECU 24 at step 244 determines a difference dW between the required engine output force $W_E$ (supplied from the hybrid ECU 22) and the expected engine output force $W_O$ (obtained in the step 242) by subtracting the $W_O$ from the $W_E$.

The engine ECU 24 at step 246 transmits a signal indicative of the difference dW ($=W_E-W_O$) as the decrease of the engine output force caused by the decrease of the amount of the intake air, to the hybrid ECU 22. The hybrid ECU 22 detects the decrease (the difference dW) of the engine output force based on the signal supplied by the engine ECU 24. After the step 246 is performed, the vehicle control routine of FIG. 5 at the present cycle is terminated.

In the above-described vehicle control routine of FIG. 5, when the upper-limit value of the opening angle for the throttle valve 74 is changed to a smaller value, the decrease of the output force of the engine 40, caused by the decrease of the amount of the intake air, is calculated and notified to the hybrid ECU 22 by the engine ECU 24.

Figure 6:
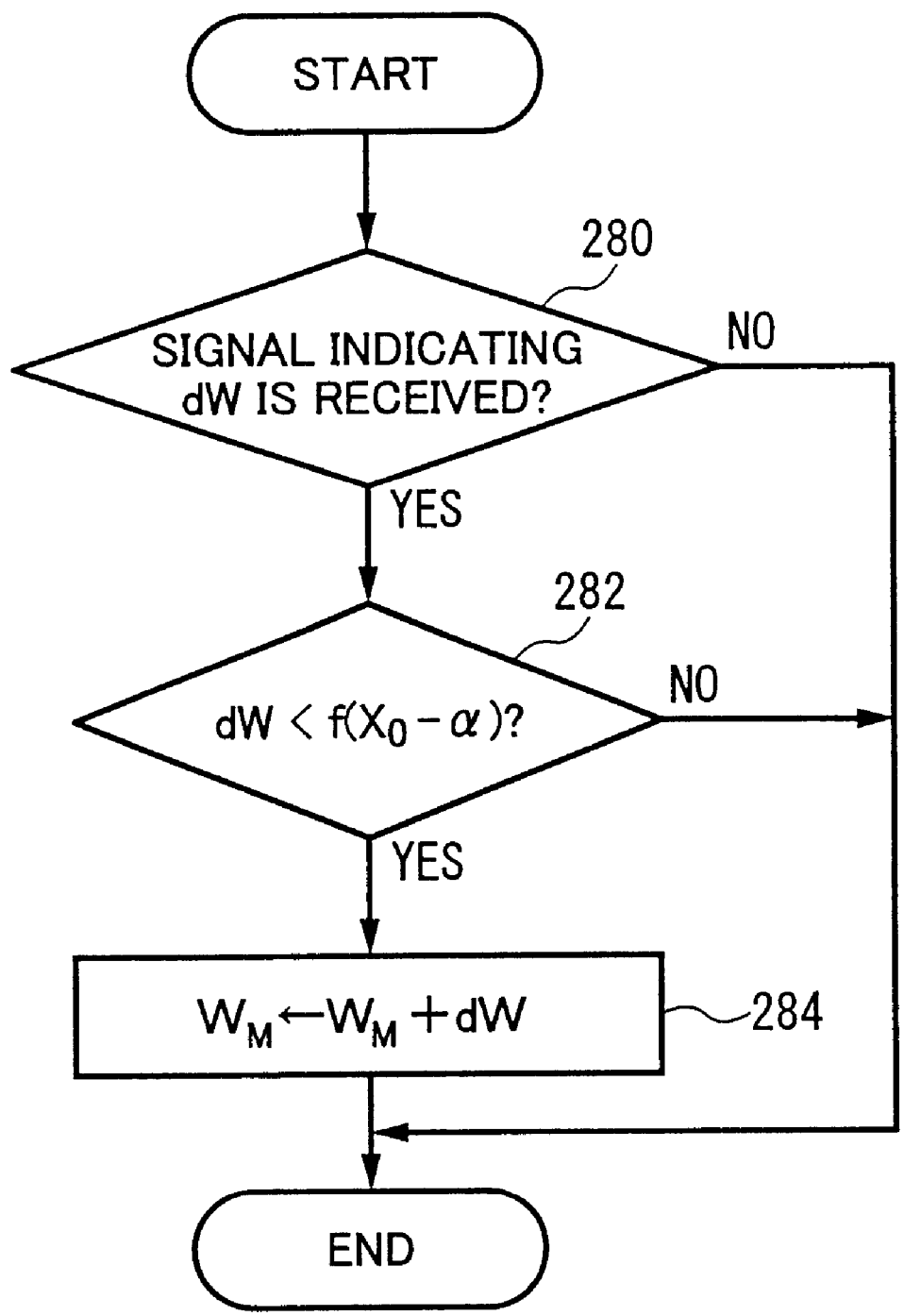
FIG. 6 is a flowchart for explaining a vehicle control routine executed by a hybrid ECU in the first preferred embodiment.

FIG. 6 shows a vehicle control routine executed by the hybrid ECU in the first preferred embodiment.

In the present embodiment, the decrease of the output force of the engine 40 due to the decrease of the amount of the intake air is detected from the signal supplied by the engine ECU 22, and the output force of the motor 42 is increased by an amount corresponding to the decrease of the engine output force, so that the sum of the engine output force and the motor output force is maintained at a level that meets the required output force of the vehicle 20. The execution of the vehicle control routine of FIG. 6 is repeatedly started by the engine ECU 24 each time the vehicle control routine is terminated.

As shown in FIG. 6, at a start of the vehicle control routine, the hybrid ECU 22 at step 280 determines whether the signal indicative of the decrease (the difference dW) of the engine output force, supplied by the engine ECU 24, is received at the hybrid ECU 22. When the result at the step 280 is negative, it is determined that the performance of the vehicle control routine is not needed. In this case, the vehicle control routine of FIG. 6 at the present cycle is terminated. On the other hand, when the result at the step 280 is affirmative, it is determined that the performance of the vehicle control routine is needed, and the hybrid ECU 22 detects the decrease (the difference dW) of the engine output force based on the received signal. The control of the hybrid ECU 22 in this case is transferred to step 282.

Figure 7:
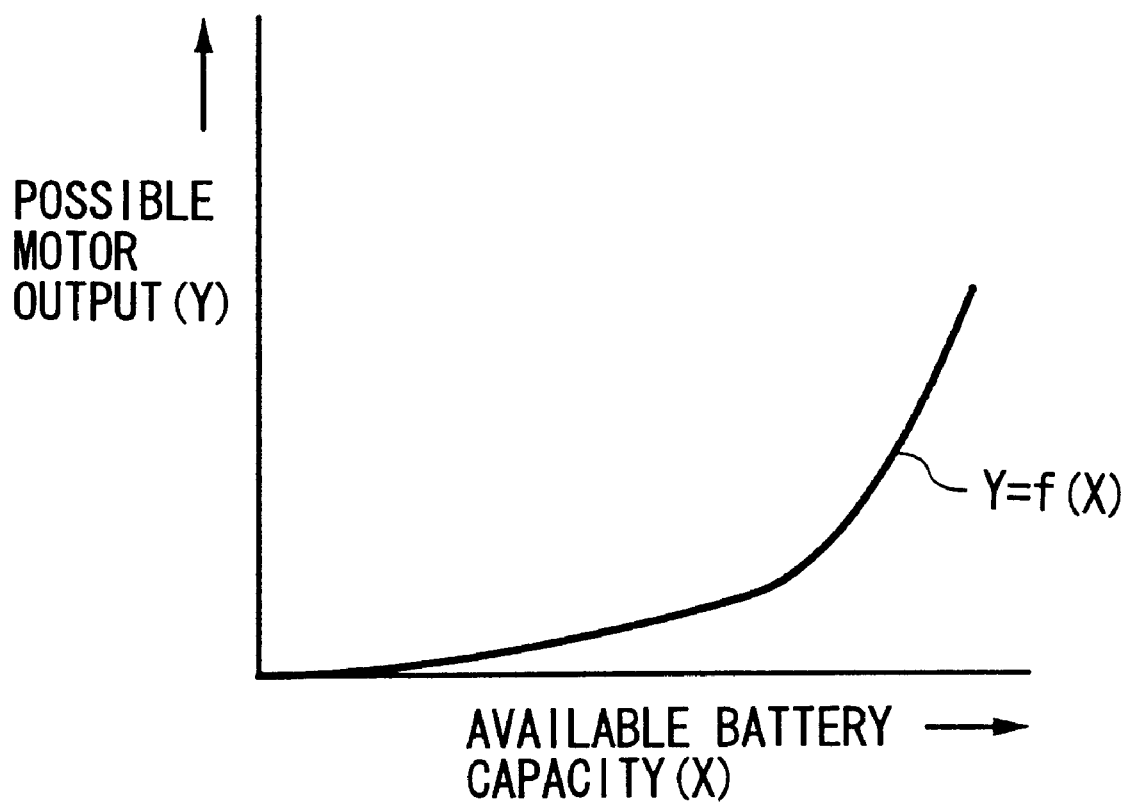
FIG. 7 is a diagram for explaining a map between the available battery capacity and the possible motor output power.

FIG. 7 shows a map between the available battery capacity and the possible motor output power. When the available battery capacity (X) of the battery 50 is detected, the hybrid ECU 22 determines a possible motor output force Y (=f(X−α) from the available battery capacity (X) minus a certain value (α) by using the map (Y=f(X)) of FIG. 7. The map as shown in FIG. 7 is stored, in advance, in the memory (not shown) of the hybrid ECU 22.

In the vehicle control routine of FIG. 6, the hybrid ECU 22 at step 282 determines whether the decrease (dW) of the engine output force (obtained in the step 280) is less than the possible motor output force Y=f (X−α) (obtained by using the map of FIG. 7).

When the result at the step 282 is negative, it is determined that the possible motor output force Y of the motor 40 is not sufficiently large to compensate for the decrease of the engine output force. In this case, the vehicle control routine of FIG. 6 at the present cycle is terminated. On the other hand, when the result at the step 282 is affirmative, it is determined that the possible motor output force Y of the motor 40 is sufficiently large to compensate for the decrease of the engine output force. The control of the hybrid ECU 22 in this case is transferred to step 284.

The hybrid ECU 22 at step 284 determines a new motor output force $W_M$ by adding the difference dW to the required motor output force $W_M$ of the motor 42 ($W_M \leftarrow W_M + dW$). In the step 284, the hybrid ECU 22 supplies a control signal indicative of the new motor output force $W_M$ to the motor ECU 26 so that the motor 42 is controlled to generate the new motor output force $W_M$. After the step 284 is performed, the vehicle control routine of FIG. 6 at the present cycle is terminated.

In the above-described vehicle control routine of FIG. 6, the decrease of the output force of the engine 40 due to the decrease of the amount of the intake air is detected from the signal supplied by the engine ECU 22, and the output force of the motor 42 is increased by the amount corresponding to the decrease of the engine output force, so that the sum of the engine output force and the motor output force is maintained at a level that meets the required output force of the vehicle 20. It is possible for the vehicle control apparatus of the present embodiment to avoid the lowering of the total output force of the vehicle 20 even when the upper-limit value of the opening angle for the throttle valve 74 is changed to a smaller value. Further, the evaporated fuel system diagnostic apparatus of the first preferred embodiment is effective in maintaining the negative pressure of the intake passage 70 that is sufficiently large to reduce the internal pressure of the evaporated fuel system. The internal pressure of the evaporated fuel system can be quickly reduced to the reference pressure without lowering the total output force of the vehicle 20.

Generally, in the evaporated fuel system, even when the throttle valve 74 is placed at the same throttle opening angle, the negative pressure of the intake passage 70 varies depending on the atmospheric pressure. Even when the throttle valve 74 is set at the same throttle opening angle, the smaller the atmospheric pressure, the smaller in magnitude the negative pressure of the intake passage 70. For this reason, when the atmospheric pressure is comparatively small, it is difficult to maintain the negative pressure of the intake passage 70 that is sufficiently large.

Figure 8:
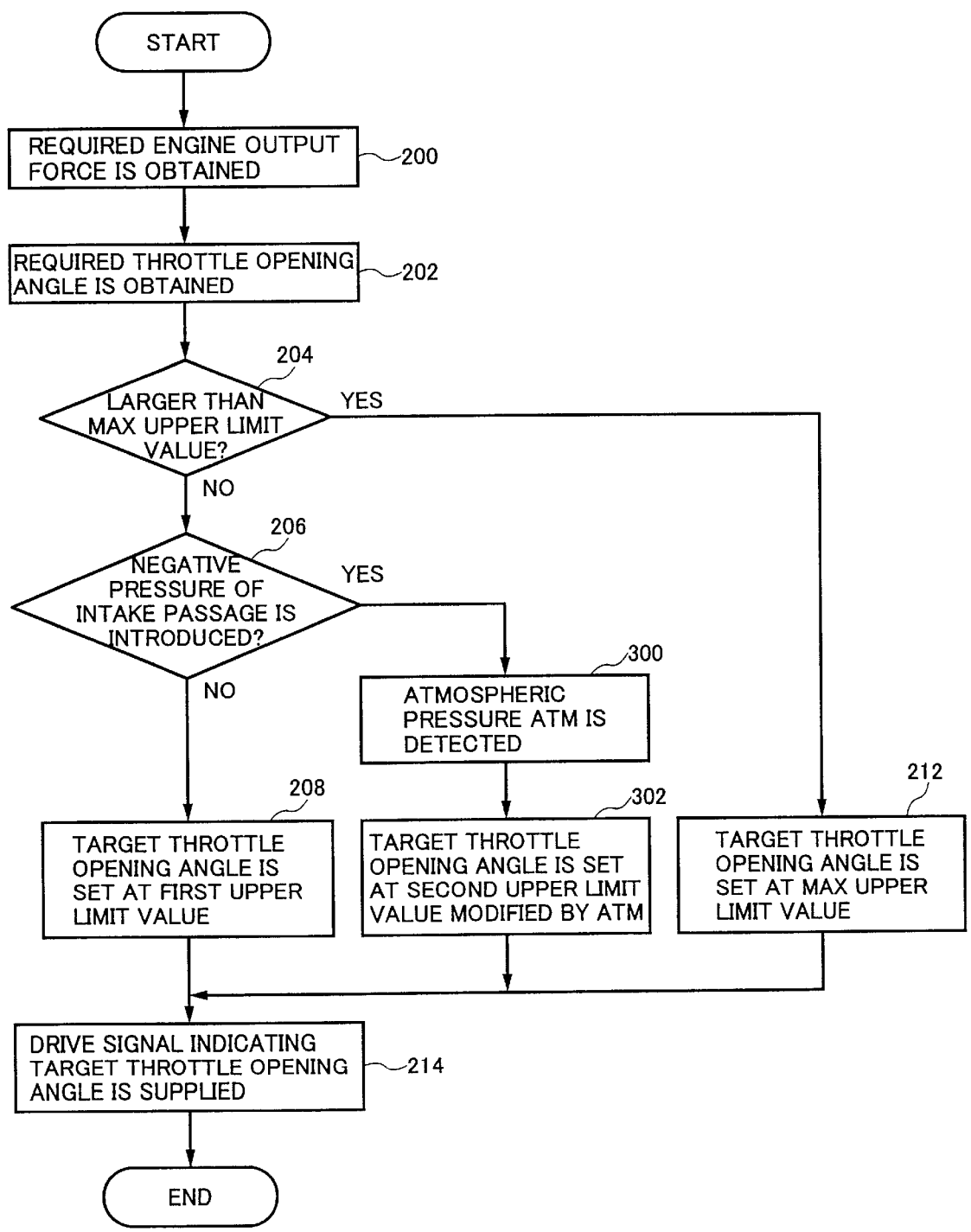
FIG. 8 is a flowchart for explaining a malfunction determination control routine executed by the engine ECU in a second preferred embodiment of the evaporated fuel system diagnostic apparatus of the invention.

FIG. 8 shows a malfunction determination control routine executed by the engine ECU in a second preferred embodiment of the evaporated fuel system diagnostic apparatus of the invention.

In the present embodiment, the evaporated fuel system diagnostic apparatus is configured so that the upper-limit value of the opening angle for the throttle valve 74 is changed, when introducing the negative pressure of the intake passage 70 into the evaporated fuel system, to an upper-limit value that is smaller than the first upper-limit value used for the throttle valve 74 in a normal operating condition, and further, the upper-limit value is modified depending on the atmospheric pressure, and the target throttle opening angle is set at the modified upper-limit value. Therefore, the evaporated fuel system diagnostic apparatus of the present embodiment is effective in maintaining the negative pressure of the intake passage 70 that is sufficiently large to reduce the internal pressure of the evaporated fuel system, regardless of whether the atmospheric pressure is small.

In FIG. 8, the steps which are essentially the same as corresponding steps in FIG. 3 are designated by the same reference numerals, and a duplicate description will be omitted.

In the malfunction determination control routine of FIG. 8, when the result at the step 206 is affirmative, the engine ECU 24 at step 300 detects an atmospheric pressure ATM. In the step 300, the engine ECU 24 detects the throttle opening angle TA of the throttle valve 74 from the signal supplied by the throttle position sensor 78, and detects the engine speed NE from the signal supplied by the crank angle sensor 124, and determines a reference intake air flow rate based on the TA and the NE. Further, the engine ECU 24 detects the actual intake air flow rate Ga from the signal supplied by the air flow meter 80, and determines a difference between the reference intake air flow rate and the actual intake air flow rate Ga. Therefore, in the step 300, the engine ECU 24 detects the atmospheric pressure ATM based on the difference between the reference intake air flow rate and the actual intake air flow rate.

Alternatively, a pressure sensor that directly outputs a signal indicative of the actual atmospheric pressure may be provided at a certain position on the evaporated fuel system of FIG. 2. In such alternative embodiment, the engine ECU 24 detects the actual atmospheric pressure ATM based on the signal supplied by the pressure sensor.

FIG. 9 shows a map of the second upper-limit value of the throttle opening angle for the malfunction determination control. In the map of FIG. 9, the second upper-limit value is determined based on a relationship between the engine speed NE and the atmospheric pressure ATM. As shown in FIG. 9, even at the same engine speed, the smaller the atmospheric pressure ATM, the smaller the second upper-limit value.

In the malfunction determination control routine of FIG. 8, after the step 300 is performed, the engine ECU 24 at step 302 determines a modified second upper-limit value of the throttle opening angle from the atmospheric pressure ATM and the engine speed NE by using the map of FIG. 9, and sets the target throttle opening angle at the modified second upper-limit value.

After the step 302 is performed, the engine ECU 24 at the step 214 supplies a drive signal indicative of the target throttle opening angle to the throttle actuator 76 so that the throttle valve 74 is placed at the target throttle opening angle by the throttle actuator 76 in accordance with the drive signal. After the step 214 is performed, the malfunction determination control routine of FIG. 8 at the present cycle is terminated.

According to the malfunction determination control procedure of the above-described embodiment, it is possible to maintain, when introducing the negative pressure of the intake passage 70 into the evaporated fuel system, the negative pressure of the intake passage 70 that is sufficiently large to reduce the internal pressure of the evaporated fuel system, regardless of whether the atmospheric pressure is small. The evaporated fuel system diagnostic apparatus of the above-described embodiment is effective in quickly reducing the pressure in the evaporated fuel system to the reference pressure for the determination of the occurrence of a leakage-type malfunction in the evaporated fuel system.

Figure 10:
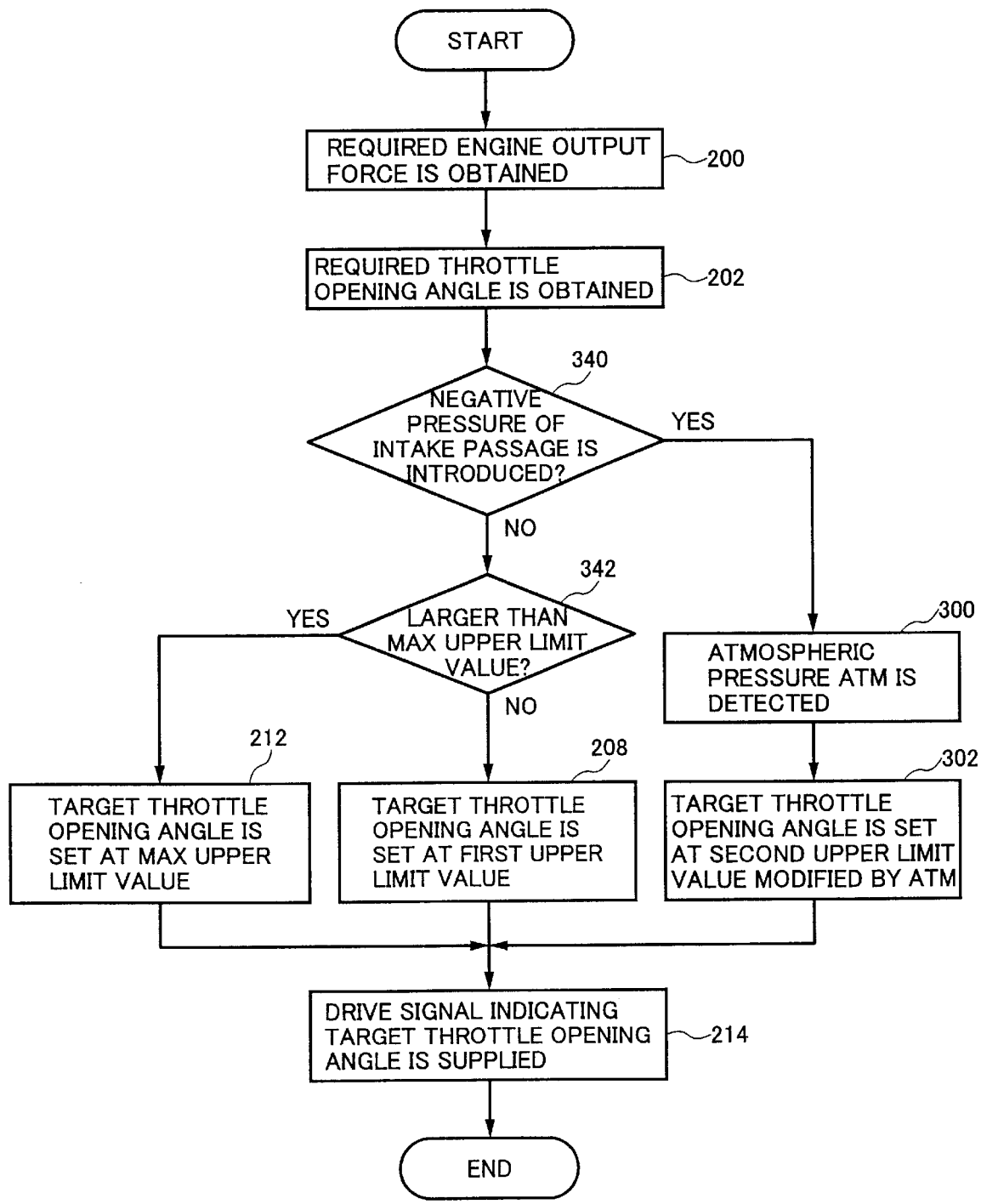
FIG. 10 is a flowchart for explaining a malfunction determination control routine executed by the engine ECU in a third preferred embodiment of the evaporated fuel system diagnostic apparatus of the invention.

FIG. 10 shows a malfunction determination control routine executed by the engine ECU in a third preferred embodiment of the evaporated fuel system diagnostic apparatus of the invention.

In the previously described embodiments of FIG. 3 and FIG. 8, when the engine ECU 24 at the step 204 determines that a rapid acceleration of the vehicle 20 is demanded by the vehicle operator, the engine ECU 24 controls the throttle actuator 76 so that the opening angle of the throttle valve 74 is set at the maximum permissible upper-limit value. When the throttle valve 74 is set at such large opening angle, the negative pressure of the intake passage 70 becomes small in magnitude. In such a case, the internal pressure of the evaporated fuel system may not reach the reference pressure, or much time is needed for the internal pressure of the evaporated fuel system to reach the reference pressure.

In order to eliminate the above problem, the evaporated fuel system diagnostic apparatus of the present embodiment is configured so that the determination as to whether a rapid acceleration of the vehicle 20 is demanded by the vehicle operator is subsequently performed after the determination as to whether the negative pressure of the intake passage 70 is introduced into the evaporated fuel system is performed. According to the malfunction determination control routine of the present embodiment, when introducing the negative pressure of the intake passage 70 into the evaporated fuel system, the setting of the throttle valve at a large opening angle is safely and reliably prevented.

In FIG. 10, the steps which are essentially the same as corresponding steps in FIG. 8 are designated by the same reference numerals, and a duplicate description will be omitted.

In the malfunction determination control routine of FIG. 10, after the step 202 is performed, the engine ECU 24 at step 340 determines whether the negative pressure of the intake passage 70 is currently introduced into the evaporated fuel system. When the result at the step 340 is negative, the control of the engine ECU 24 is transferred to step 342, which will be described later. When the result at the step 340 is affirmative, the control of the engine ECU 24 is transferred to the steps 300 and 302, which are the same as the corresponding steps in FIG. 8.

The engine ECU 24 at step 342 determines whether the required throttle opening angle, obtained in the step 202, is larger than the maximum permissible upper-limit value indicated by the dotted line (a) in FIG. 4.

When the result at the step 342 is affirmative, it is determined that a rapid acceleration of the hybrid vehicle 20 is currently demanded by the vehicle operator. The control of the engine ECU 24 in this case is transferred to the step 212, which is the same as the corresponding step in FIG. 8. On the other hand, when the result at the step 342 is negative, it is determined that a rapid acceleration of the hybrid vehicle 20 is not currently demanded by the vehicle operator. The control of the engine ECU 24 in this case is transferred to the step 208, which is the same as the corresponding step in FIG. 8.

The malfunction determination control routine of the above-described embodiment is effective in safely preventing the setting of the throttle valve 75 at a large opening angle, when the negative pressure of the intake passage 70 is introduced into the evaporated fuel system.

Figure 11:
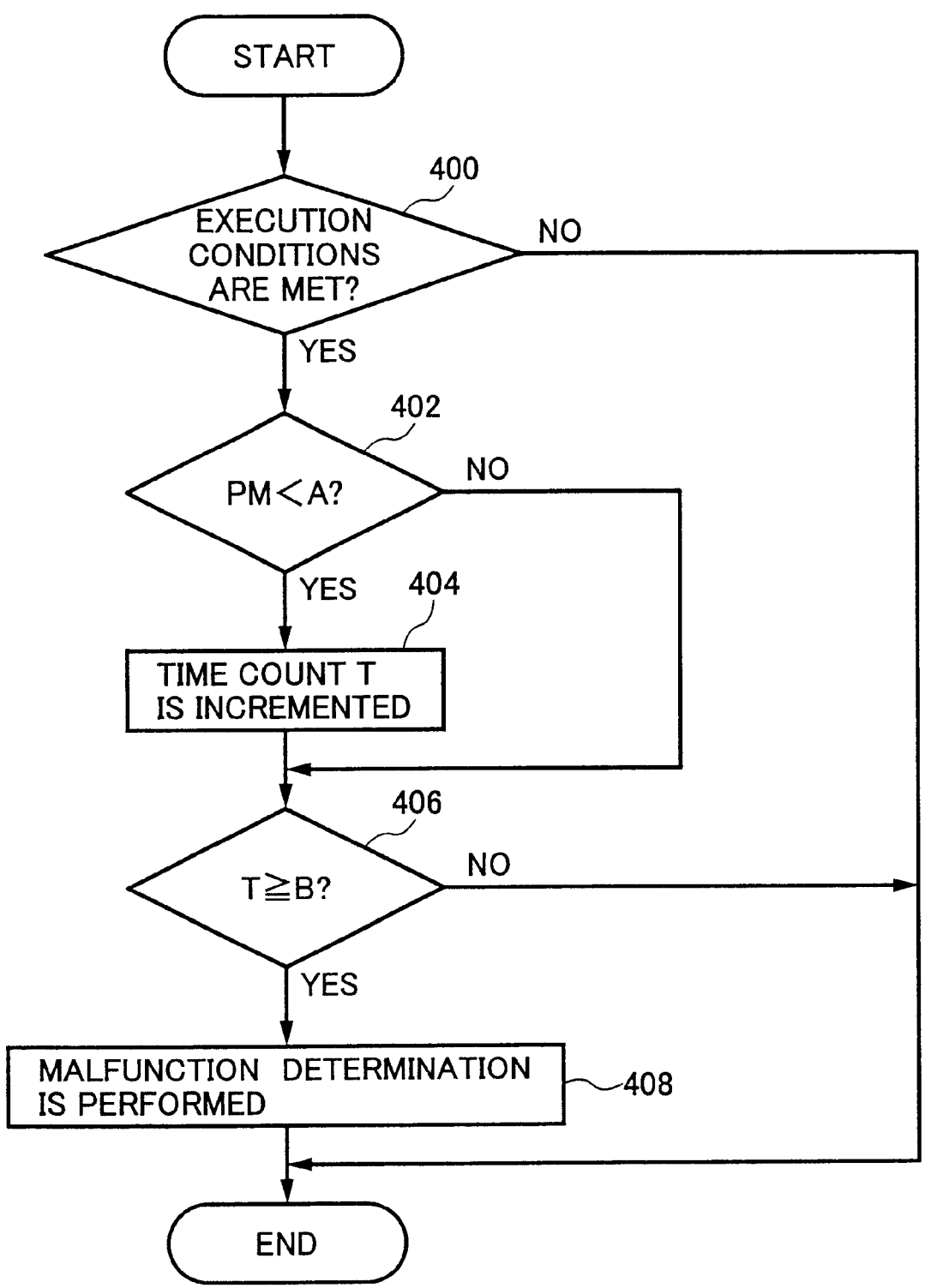
FIG. 11 is a flowchart for explaining a malfunction determination control routine executed by the engine ECU in a fourth preferred embodiment of the evaporated fuel system diagnostic apparatus of the invention.

FIG. 11 shows a malfunction determination control routine executed by the engine ECU in a fourth preferred embodiment of the evaporated fuel system diagnostic apparatus of the invention.

In the malfunction determination method of the present embodiment, it is determined whether the evaporated fuel system pressure reaches the reference pressure, based on whether an elapsed time counted from a start of the introduction of the negative pressure of the intake passage 70 into the evaporated fuel system reaches a reference time. However, there is a case in which the intake passage pressure becomes small in magnitude after the start of the introduction of the negative pressure. In such a case, the elapsed time will also reach the reference time, and it may be erroneously determined that the evaporated fuel system pressure reaches the reference pressure, although the actual internal pressure in the evaporated fuel system does not reach the reference pressure.

In order to eliminate the above problem, in the malfunction determination method of the present embodiment, the engine ECU 24 interrupts the counting of the elapsed time when the internal pressure in the intake passage 70 after the start of the introduction of the negative pressure exceeds a threshold value "A".

The execution of the malfunction determination control routine of FIG. 11 is repeatedly started by the engine ECU 24 each time the control routine is terminated.

As shown in FIG. 11, at a start of the malfunction determination control routine, the engine ECU 24 at step 400 determines whether the conditions for starting the execution of the malfunction determination procedure are met. For example, in the step 400, when the operation of the engine 40 is started and the introduction of a negative pressure of the intake passage 70 into the fuel tank 60 is started, it is determined that the execution conditions are met.

When the result at the step 400 is negative, the control routine at the present cycle is terminated without performing subsequent steps. When the result at the step 400 is affirmative, the control of the engine ECU 24 is transferred to step 402.

The engine ECU 24 at step 402 determines whether an internal pressure ("PM") in the intake passage 70, which is estimated based on the load of the engine 40, is less than a threshold value ("A"). When PM<A, it is determined that the intake passage pressure is sufficiently large in magnitude to reduce the internal pressure of the evaporated fuel system to the reference pressure. In this case, the control of the engine ECU 24 is transferred to step 404. When PM>A, it is determined that the intake passage pressure is not sufficiently large to reduce the internal pressure of the evaporated fuel system to the reference pressure. In this case, the control of the engine ECU 24 is transferred to step 406 and the step 404 is not performed.

When the result at the step 402 is affirmative, the engine ECU 24 at step 404 increments a time count "T" that indicates an elapsed time from the start of the introduction of the negative pressure of the intake passage 70 into the fuel tank 60, for which the intake passage pressure PM is less than the threshold value A. After the step 404 is performed, the control of the engine ECU 24 is transferred to step 406.

The engine ECU 24 at step 406 determines whether the time count ("T"), incremented in the step 404, is above a reference time ("B") (T≧B).

When the result at the step 406 is negative, it is determined that a sufficient amount of the fuel vapor is not purged from the evaporated fuel system into the intake passage 70 via the purge passage 102. In this case, the malfunction determination control routine of FIG. 11 at the present cycle is terminated without performing a subsequent step.

When the result at the step 406 is affirmative, it is determined that a sufficient amount of the fuel vapor is purged from the evaporated fuel system into the intake passage 70 via the purge passage 102. In this case, the engine ECU 24 at step 408 performs the malfunction determination that determines whether a leakage-type malfunction occurs in the evaporated fuel system. After the step 408 is performed, the malfunction determination control routine of FIG. 12 at the present cycle is terminated.

According to the malfunction determination control routine of the above-described embodiment, it is possible to avoid the erroneous determination that the evaporated fuel system pressure reaches the reference pressure "A", even when the intake passage pressure becomes small in magnitude after the start of the introduction of the negative pressure.

Figure 12:
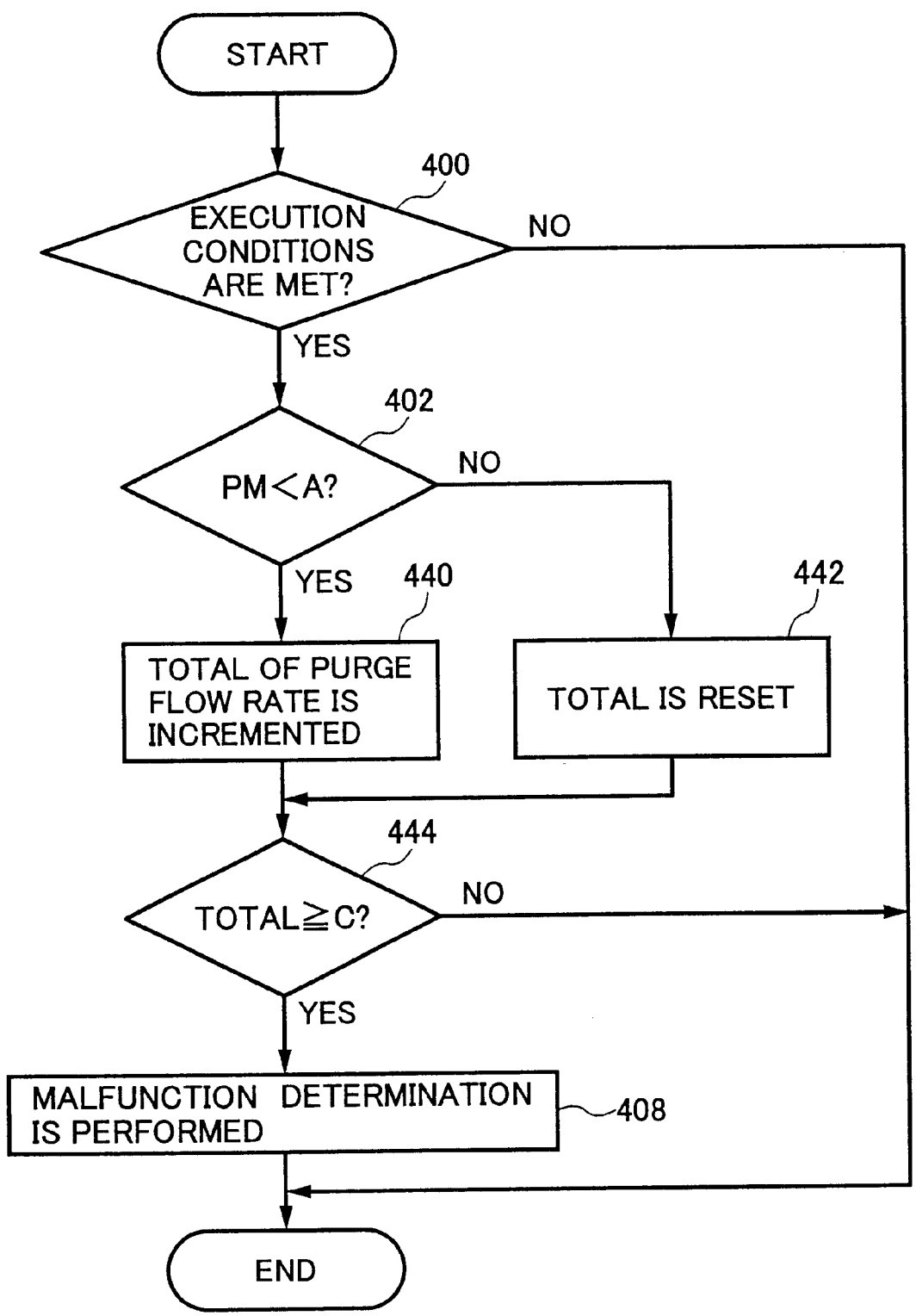
FIG. 12 is a flowchart for explaining a malfunction determination control routine executed by the engine ECU in a fifth preferred embodiment of the evaporated fuel system diagnostic apparatus of the invention.

FIG. 12 shows a malfunction determination control routine executed by the engine ECU in a fifth preferred embodiment of the evaporated fuel system diagnostic apparatus of the invention.

In FIG. 12, the steps which are essentially the same as corresponding steps in FIG. 11 are designated by the same reference numerals, and a description thereof will be omitted.

In the malfunction determination method of the present embodiment, it is determined whether the evaporated fuel system pressure reaches the reference pressure, based on whether a total of a flow rate of the purge fuel vapor counted from a start of the introduction of the negative pressure of the intake passage 70 into the evaporated fuel system reaches a reference count. However, there is a case in which the intake passage pressure becomes small in magnitude after the start of the introduction of the negative pressure. In such a case, the total of the flow rate of the purged fuel vapor will also reach the reference count, and it may be erroneously determined that the evaporated fuel system pressure reaches the reference pressure, although the actual internal pressure in the evaporated fuel system does not reach the reference pressure.

In order to eliminate the above problem, in the malfunction determination method of the present embodiment, the engine ECU 24 resets the total of the flow rate to zero when the internal pressure in the intake passage 70 after the start of the introduction of the negative pressure exceeds a threshold value "A".

In the malfunction determination control routine of FIG. 12, when the result at the step 402 is affirmative, the engine ECU 24 at step 440 increments a total of a flow rate of the purged fuel vapor. The total of the purge flow rate is calculated by the engine ECU 24 based on a relationship between the detected intake air flow rate Ga and the detected tank pressure P. After the step 440 is performed, the control of the engine ECU 24 is transferred to step 444.

When the result at the step 402 is negative, the engine ECU 24 at step 442 resets the total of the purge flow rate to zero. After the step 442 is performed, the control of the engine ECU 24 is transferred to step 444.

The engine ECU 24 at step 444 determines whether the total of the purge flow rate, obtained in the step 440 or the step 442, is above a reference count "C" (TOTAL≧C).

When the result at the step 444 is negative, it is determined that a sufficient amount of the fuel vapor is not purged from the evaporated fuel system into the intake passage 70 via the purge passage 102. In this case, the malfunction determination control routine of FIG. 12 at the present cycle is terminated without performing a subsequent step.

When the result at the step 444 is affirmative, it is determined that a sufficient amount of the fuel vapor is purged from the evaporated fuel system into the intake passage 70 via the purge passage 102. In this case, the engine ECU 24 at the step 408 performs the malfunction determination that determines whether a leakage-type malfunction occurs in the evaporated fuel system. After the step 408 is performed, the malfunction determination control routine of FIG. 12 at the present cycle is terminated.

According to the malfunction determination control routine of the above-described embodiment, it is possible to avoid the erroneous determination that the evaporated fuel system pressure reaches the reference pressure "A", even when the intake passage pressure becomes small in magnitude after the start of the introduction of the negative pressure.

In the above-described first through fifth preferred embodiments, the fuel tank 60 of the type containing the bladder 62 is provided for the evaporated fuel system. The present invention is not limited to these embodiments. Alternatively, a fuel tank of another type containing no bladder may be provided, instead of the fuel tank 60, for the evaporated fuel system without departing from the scope of the present invention.

Figure 13:
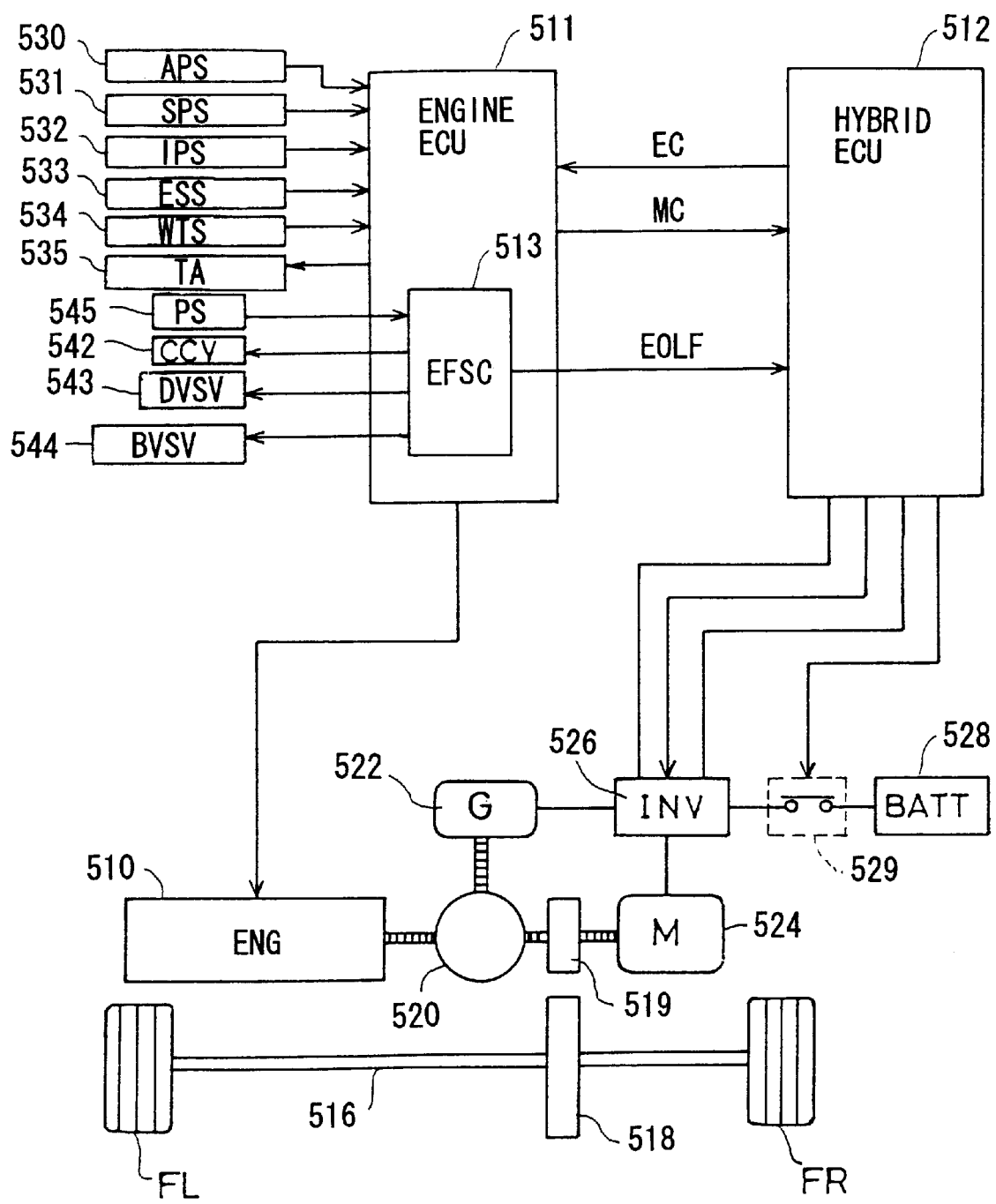
FIG. 13 is a diagram of a powertrain of an automotive vehicle on which another embodiment of the evaporated fuel system diagnostic apparatus of the invention is mounted.

Next, FIG. 13 shows a powertrain of an automotive vehicle on which another preferred embodiment of the evaporated fuel system diagnostic apparatus of the invention is mounted.

In the present embodiment, the automotive vehicle is a hybrid vehicle that is equipped with an internal combustion engine as a main power source and an electric motor as a secondary power source.

As shown in FIG. 13, the hybrid vehicle includes a hybrid ECU 512 for controlling an electric motor 524 ("M") and an engine ECU 511 for controlling an internal combustion engine 510 ("ENG"). The engine ECU 511 includes an evaporated fuel system control portion 513 ("EFSC") for controlling an evaporated fuel system 515 in the hybrid vehicle. In the powertrain of the hybrid vehicle, there is provided an axle 516 that links a front-left wheel ("FL") and a front-right wheel ("FR"). A reduction gear 518 is secured to the axle 516. A planetary gear mechanism 520 is connected through a gear 519 to the reduction gear 518. The planetary gear mechanism 520 includes a planetary carrier connected to the output shaft of the engine 510 ("ENG"), a ring gear connected to the output shaft of the motor 524 ("M"), and a sun gear connected to the output shaft of a generator 522 ("G").

Both the motor 524 and the generator 522 are connected to an inverter 526 ("INV"), and a battery 528 ("BATT") is connected through a main relay 529 to the inverter 526. The hybrid ECU 512 is connected to the inverter 526. The hybrid ECU 512 is connected to the main relay 529. The hybrid ECU 512 supplies a drive signal to the main relay 529 so that the main relay 529 is turned ON. When the main relay 529 is turned ON, electrical power from the battery 528 is supplied to the inverter 526 through the main relay 529. The inverter 526 includes a three-phase bridge circuit between the battery 528 and the generator 522 and a three-phase bridge circuit between the battery 528 and the motor 524. In the three-phase bridge circuits of the inverter 526, the direct current is transformed into the three-phase alternating current or vice versa. With respect to the generator 522 and the motor 524, the hybrid ECU 512 controls the inverter 526 such that the generator 522 and the motor 524 are driven at a revolution speed that is proportional to the frequency of the alternating current supplied by the inverter 526 and the generator 522 and the motor 524 generate an output torque that is proportional to the magnitude of the supplied alternating current.

When the operation of the engine 510 is not started, the electrical power from the battery 528 is supplied to the generator 522 via the inverter 526, and the generator 522 acts as a starter motor that starts the operation of the engine 510. After the starting operation of the engine 510 is completed, the mechanical power from the output shaft of the engine 510 is transformed into electrical power by the inverter 526 and such electrical power is supplied to one of the battery 528 or the motor 524.

Further, when the motor 524 is running in a normal condition, the electrical power from the inverter 526 is supplied to the electric motor 524. The motor 524 acts as the secondary power source that generates an auxiliary output power from the electrical power supplied by the inverter 526, in order to help increase the total output force of the hybrid vehicle. During the braking of the vehicle, the rotation of the axle 516 causes the mechanical power to be produced by the motor 524 and the electrical power derived from the inverter 526 is supplied to the battery 528. The motor 524 acts as an electrical power generator that uses the electrical power supplied by the inverter 526, to put the battery 528 on charge.

The inverter 526 includes a current detection circuit which outputs a signal indicative of an electrical current supplied to the generator 522, a voltage detection circuit which outputs a signal indicative of a voltage supplied to the generator 522, a current detection circuit which outputs a signal indicative of an electrical current supplied to the motor 524, and a voltage detection circuit which outputs a signal indicative of a voltage supplied to the motor 524. These detection signals, output by these detection circuits, are supplied from the inverter 526 to the hybrid ECU 512. The hybrid ECU 512 controls the generator 522 and the motor 524 based the detection signals supplied by the inverter 526, so that the running condition of the vehicle is maintained in a desired running condition for the vehicle operator.

Further, in the hybrid vehicle of FIG. 13, the engine ECU 511 is connected to the engine 510. The engine ECU 511 supplies a drive signal to the engine 510, and the engine 510 generates an output force in accordance with the drive signal supplied by the engine ECU 511. An accelerator pedal position sensor 530 ("APS"), a shift position sensor 531 ("SPS"), an intake pressure sensor 32 ("IPS"), an engine speed sensor 533 ("ESS"), and a water temperature sensor 534 ("WTS") are connected to respective inputs of the engine ECU 511. The engine ECU 511 detects an accelerator opening angle based on a signal supplied by the APS 530, detects a shift position based on a signal supplied by the SPS 531, detects an amount of intake air based on a signal supplied by the IPS 532, detects an engine speed based on a signal supplied by the ESS 533, and detects a temperature of engine cooling water based on a signal supplied by the WTS 534. The engine ECU 510 controls the engine 510 by supplying the drive signal to the engine 510 in accordance with the results of the detection, so that the running condition of the vehicle is maintained in a desired running condition for the vehicle operator.

An output of the engine ECU 511 is connected to a throttle actuator 535 ("TA"). The engine ECU 511 supplies a control signal to the TA 535 so that a throttle valve 536 is placed at a desired throttle opening angle by the TA 535 in accordance with the drive signal supplied by the engine ECU 511.

As described above, the vehicle of FIG. 13 is a hybrid vehicle that is equipped with the engine 510 as the main power source and the motor 524 as the secondary power source. The hybrid vehicle is propelled by a sum of the output force of the engine 510 and the output force of the motor 524. The sum of the engine output force and the motor output force is determined in accordance with the operating condition of the vehicle.

In the hybrid ECU 512, a required output force of the hybrid vehicle is calculated based on the detected accelerator pedal position (the ACCP) and the detected vehicle speed (the SPD). After the required vehicle output force is calculated, the hybrid ECU 512 determines a required output force (called the $W_E$) of the engine 510 depending on the required vehicle output force, and determines a required output force (called the $W_M$) of the motor 524 depending on the required vehicle output force. In the vehicle of FIG. 13, the hybrid ECU 512 is connected to each of the engine ECU 511 and the inverter 526. The hybrid ECU 512 supplies an engine control signal ("EC") to the engine ECU 511 so that the engine ECU 511 instructs the engine 510 to generate the required output force $W_E$. The engine ECU 511 supplies a motor control signal ("MC") to the inverter 526 through the hybrid ECU 512, so that the motor 524 generates the required output force $W_M$. Hence, the vehicle is propelled by the sum of the required output force $W_E$ of the engine 510 and the required output force $W_M$ of the motor 524.

Figure 14:
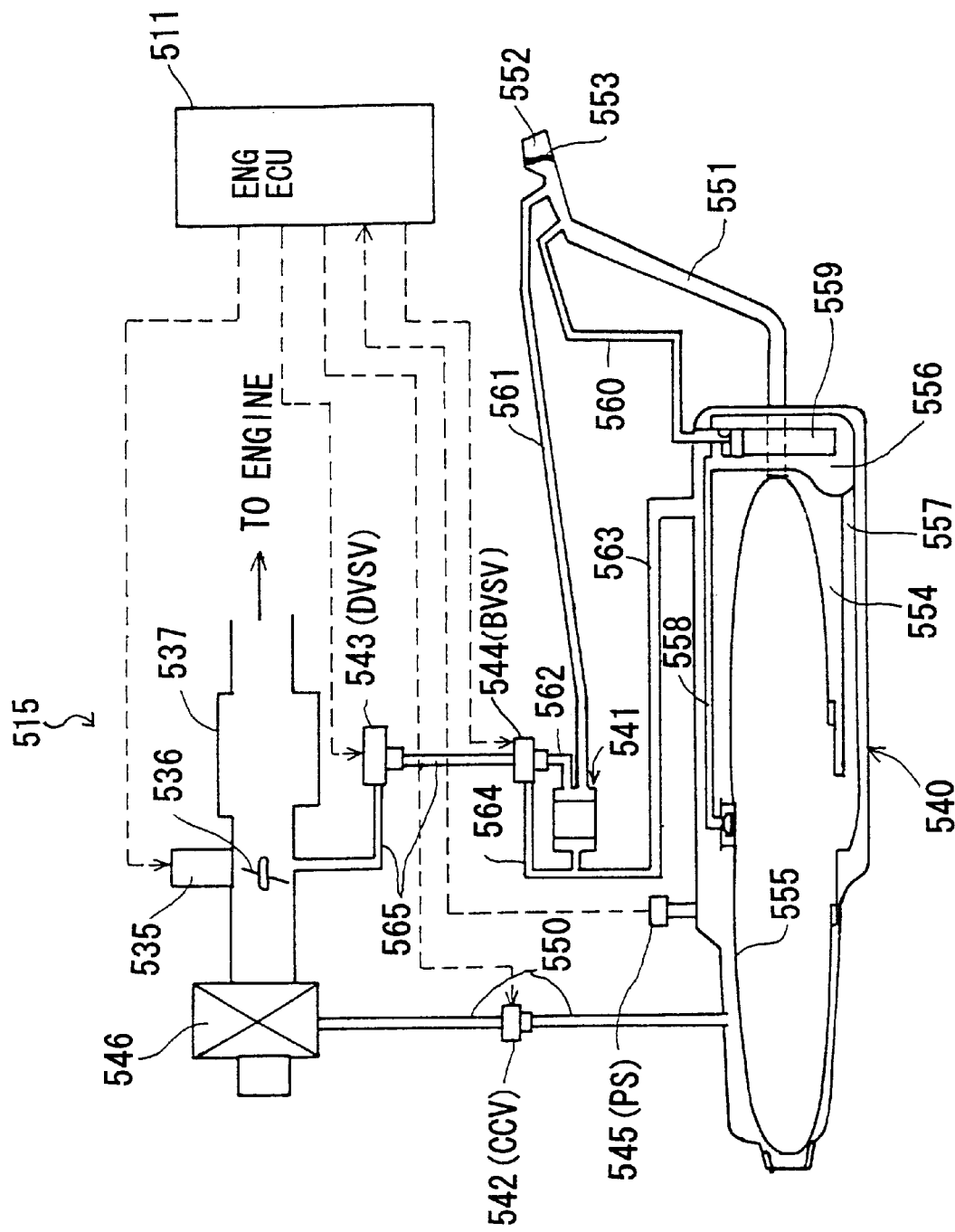
FIG. 14 is a diagram of an evaporated fuel system to which the present embodiment of the evaporated fuel system diagnostic apparatus is applied.

FIG. 14 shows an evaporated fuel system in the vehicle of FIG. 13 to which the evaporated fuel system diagnostic apparatus of the present embodiment is applied.

As shown in FIG. 14, in the evaporated fuel system 515 of the present embodiment, a fuel tank 540 is provided. The fuel tank 540 is covered with an external iron casing or resin casing. The fuel tank 540 includes a bladder 555 provided within the fuel tank 540. The internal space of the fuel tank 540 is divided by the bladder 555 into a fuel chamber and a vapor chamber 554. In the fuel tank 540, fuel is contained in the fuel chamber, and the vapor chamber 554 is filled with fuel vapor that is evaporated from the fuel within the fuel tank 540. The bladder 555 is made of an expandable resin material, and the fuel chamber is expandable in volume according to the amount of fuel contained in the fuel tank 540.

In the evaporated fuel system of FIG. 14, an air introducing pipe 550 is extended from an air cleaner 546, which is provided in an intake passage 537 of the engine 510, and the air introducing pipe 550 is connected to the fuel tank 540. The air cleaner 546 serves to filter the intake air that enters the engine 510 through the intake passage 537. At a downstream position of the air cleaner 546 in the intake passage 537, the throttle valve 536 is provided. The throttle actuator 535 is connected to the throttle valve 536. The throttle actuator 535 is connected with the engine ECU 511. The engine ECU 511 supplies a drive signal to the throttle actuator 535 so that the throttle valve 536 is placed at a desired throttle opening angle by the throttle actuator 535 in accordance with the drive signal supplied by the engine ECU 511.

A canister closed valve (CCV) 542 is provided at an intermediate portion of the air introducing pipe 550. The CCV 542 is connected with the engine ECU 511. The CCV 542 in the present embodiment is a two-position solenoid valve that is set in a valve-open position when the engine ECU 511 supplies no drive signal to the CCV 542, and set in a valve-closed position when the engine ECU 511 supplies a drive signal to the CCV 542. When the CCV 542 is set in the valve-open position, the vapor chamber 554 of the fuel tank 540 is communicated with the atmosphere by the air introducing pipe 550 via the intake passage 537 and the air cleaner 546.

A filler pipe 551 is connected into the fuel chamber of the fuel tank 540. When the fuel tank 540 is refilled with fuel, the fuel is delivered through the filler pipe 551 into the fuel chamber of the fuel tank 540. A fuel cap 552 is detachably mounted to a filler inlet 553 of the filer pipe 551. In the fuel tank 540, a lower fuel passage 557 is connected at one end to the middle position on the bottom of the fuel chamber, and an upper fuel passage 558 is connected at one end to the middle position on the top of the fuel chamber. A sub-tank 556 having a fixed volume is provided within the fuel tank 540. The lower fuel passage 557 and the upper fuel passage 558 are connected at the other ends to the sub-tank 556. A fuel pump 559 is built in the sub-tank 556. Fuel that is sucked up from the fuel tank 540 by the fuel pump 559 is subjected to pressure adjustment to obtain a given pressure of the fuel, and the fuel under the given pressure is then supplied through a fuel supply pipe (not shown) to a fuel injection valve (not shown), which is provided to inject the fuel into the engine 510.

A first vapor exhaust passage 560 is connected at one end to an upper end portion of the sub-tank 556, and connected at the other end to the filler pipe 551. The first vapor exhaust passage 560 is provided to discharge the fuel vapor that is evaporated from the fuel within the fuel chamber or the sub-tank 556 in the fuel tank 540. The fuel vapor, which is supplied through the first vapor exhaust passage 560 to the filler pipe 551, is partially liquefied into the fuel by contact with the inner wall of the filler pipe 551, and the resulting fuel is returned to the fuel chamber of the fuel tank 540.

A second vapor exhaust passage 561 is further connected at one end to the filler pipe 551. The second vapor exhaust passage 561 is provided to discharge the fuel vapor, which is evaporated from the fuel within the fuel chamber or the sub-tank 556 or directly enters the filler pipe 551 from the fuel chamber. A canister 541 is provided at the other end of the second vapor exhaust passage 561, and the second vapor exhaust passage 561 is connected into a vapor inlet hole of the canister 541. The canister 541 contains an adsorbent, such as activated carbon, which adsorbs the fuel vapor supplied from the fuel tank 540 via the second vapor exhaust passage 561.

The canister 541 includes a vapor outlet hole which is provided on the same side of the canister 541 as the vapor inlet hole. The purge passage 565 is connected through a bypass VSV 544 to one end of a purge nozzle 562. The purge nozzle 562 is connected at the other end to the vapor outlet hole of the canister 541. The purge passage 565 is connected at the other end to the intake passage 537. The purge passage 565 is a passage provided between the canister 541 and the intake passage 537 to purge the adsorbed fuel vapor from the canister 541 into the intake passage 537 of the engine 510.

A purge control valve 543 ("DVSV") is provided at an intermediate portion of the purge passage 565. The purge control valve 543 in the present embodiment is a solenoid-type vacuum switching valve (VSV), which is connected with the engine ECU 511. The purge control valve 543 is set in a valve-closed position when the engine ECU 511 supplies no drive signal to the valve 543, and set in a valve-open position when the engine ECU 511 supplies a drive signal to the valve 543.

The drive signal sent by the engine ECU 511 to the purge control valve 543 is indicative of a duty factor that defines the ratio of an on-state time within a duty cycle to a total duty-cycle time for the purge control valve 543. The purge control valve 543 is set in the valve-open position only during the on-state time of the duty factor of the drive signal supplied by the engine ECU 511, and, only during the on-state time, the fuel vapor from the canister 541 is purged into the intake passage 537 via the purge passage 565. The engine ECU 511 controls the switching of the purge control valve 543 such that the flow rate of the fuel vapor, delivered from the canister 541 into the intake passage 537, is maintained at a predetermined level.

The canister 541 further includes an air inlet hole on the opposite side of the canister 541 to the vapor inlet hole. A first vapor passage 563 is connected at one end to the air inlet hole of the canister 541. The first vapor passage 563 is connected at the other end to the vapor chamber 554 of the fuel tank 540. In the evaporated fuel system of the present embodiment, the vapor chamber 554 and the intake passage 537 (or the intake manifold) are communicated together through the first vapor passage 563, the canister 541 and the purge passage 565.

A second vapor passage 564 is connected at one end to the vapor chamber 554 of the fuel tank 540. The second vapor passage 564 is connected at the other end to the purge passage 565. In the evaporated fuel system of the present embodiment, the vapor chamber 554 and the intake passage 537 (the intake manifold 104) are communicated together through the second vapor passage 564 and the purge passage 565, which is a bypass passage going around the canister 541 rather than passing through the canister 541. Hereinafter, the second vapor passage 564 will be called the bypass passage 564. In the present embodiment, the bypass passage 564 is provided such that it has a volume that is much smaller than the volume of the vapor chamber 554 of the fuel tank 540.

At a connection position between the purge passage 565 and the second vapor passage 564, a bypass control valve 544 ("BVSV") is provided. The bypass control valve 544 in the present embodiment is a solenoid-type vacuum switching valve (VSV), which is connected with the engine ECU 511. The bypass control valve 544 is set in a first position when the engine ECU 511 supplies no drive signal to the valve 544, and set in a second position when the engine ECU 511 supplies a drive signal to the valve 544. When the bypass control valve 544 is set in the first position, the canister 541 and the first vapor passage 563 are open to the purge passage 565 through the valve 544 and the bypass passage 564 is closed by the valve 544. On the other hand, when the bypass control valve 544 is set in the second position, the canister 541 and the first vapor passage 563 are closed by the valve 544, and the bypass passage 564 is open to the purge passage 565 through the valve 544.

A tank pressure sensor 545 (also called the P sensor) is provided in the vapor chamber 554 of the fuel tank 540 at the end of the bypass passage 564. The tank pressure sensor 545 is connected with the engine ECU 511. The tank pressure sensor 545 supplies a detection signal indicative of the internal pressure (called the tank pressure P) of the bypass passage 564 and the vapor chamber 554, to the engine ECU 511. The engine ECU 511 detects the tank pressure P based on the detection signal supplied by the tank pressure sensor 545.

Next, a description will be given of the evaporated fuel system diagnostic apparatus of the present embodiment for the above-described evaporated fuel system. In the present embodiment, the evaporated fuel system control portion 513 ("EFSC") is constituted by program code instructions that are stored in the memory of the engine ECU 511. Hereinafter, the ESC 513 will be simply called the engine ECU 511 for the sake of convenience.

Figure 15:
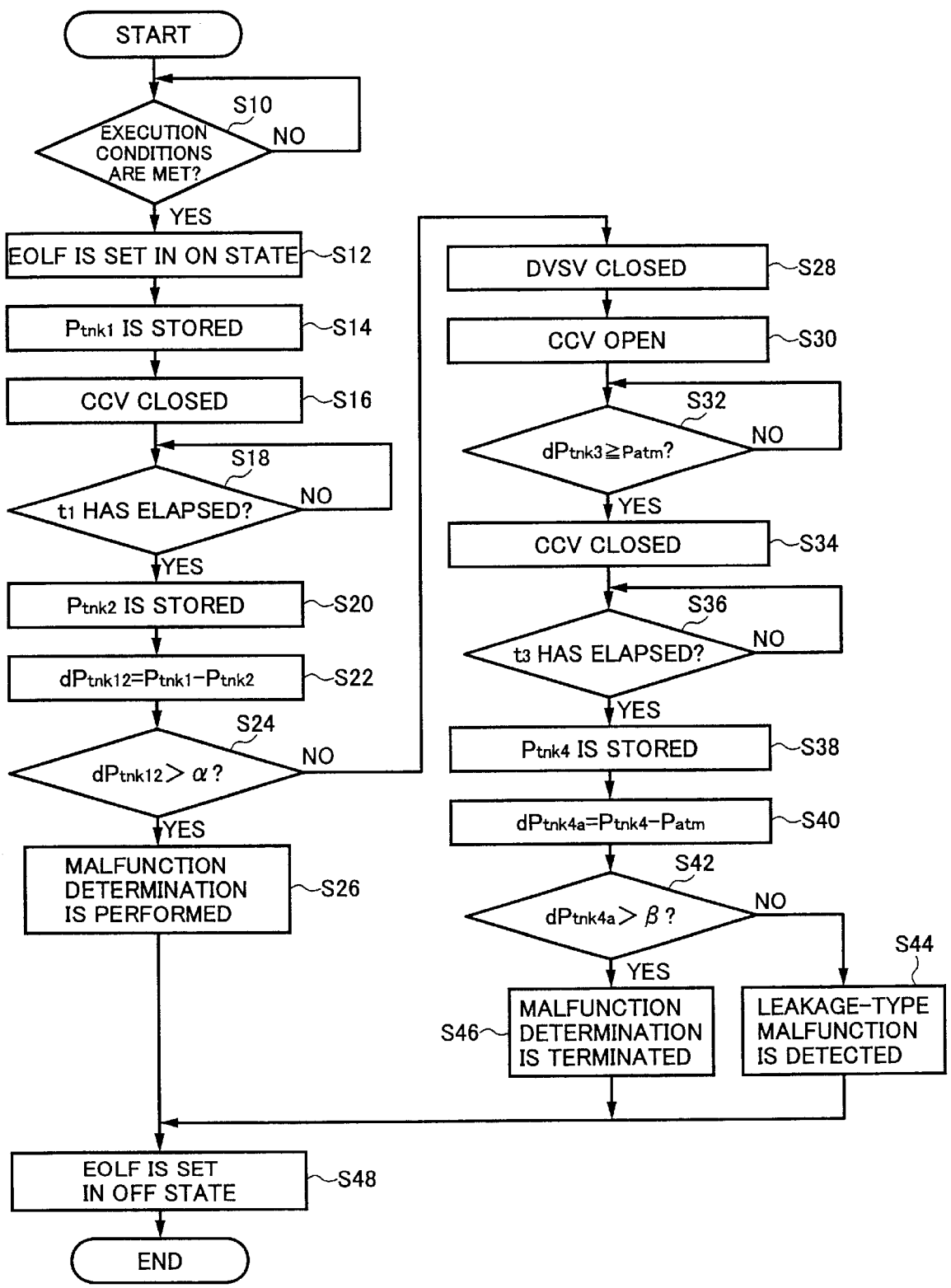
FIG. 15 is a flowchart for explaining a malfunction determination control routine executed by an engine ECU in the present embodiment of the evaporated fuel system diagnostic apparatus.
Figure 16:
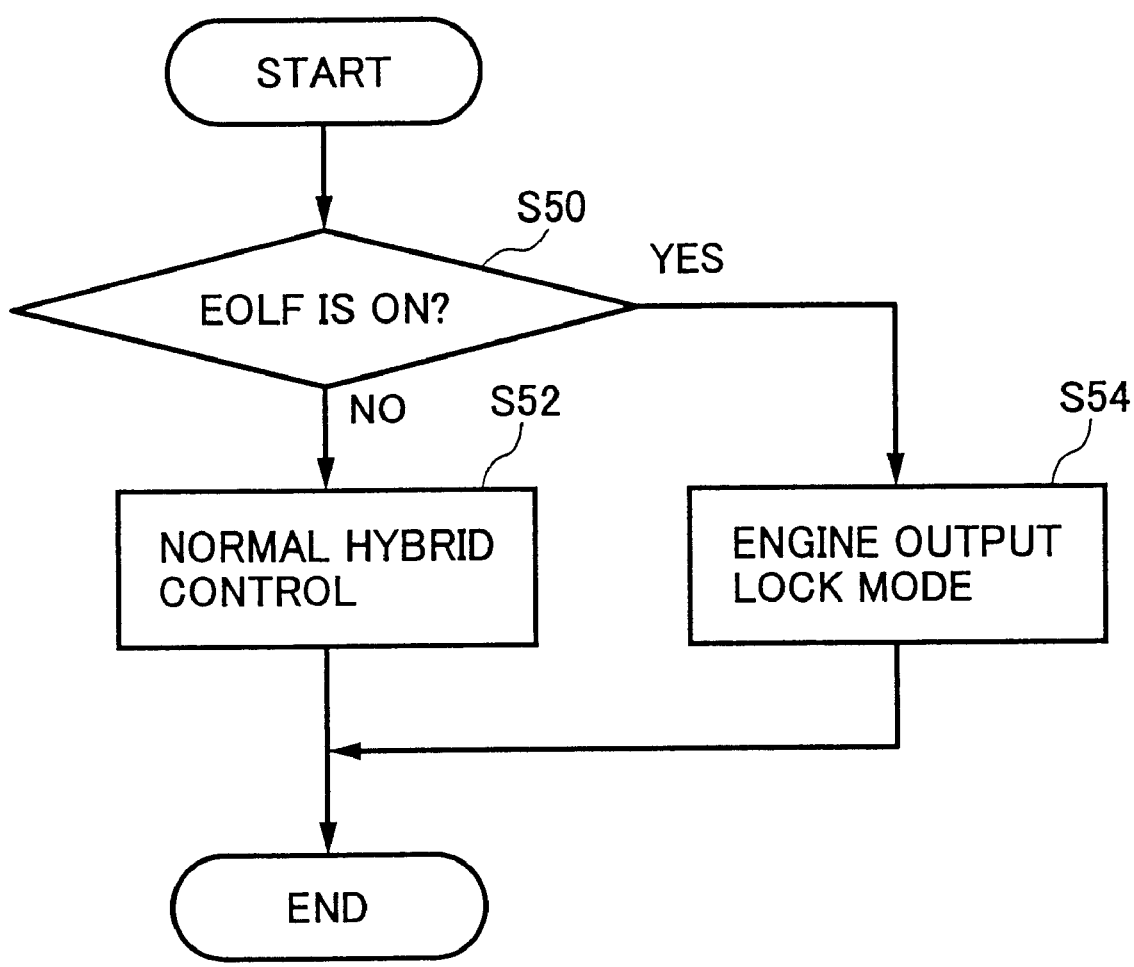
FIG. 16 is a flowchart for explaining a vehicle control routine executed by the engine ECU in the present embodiment.
Figure 17:
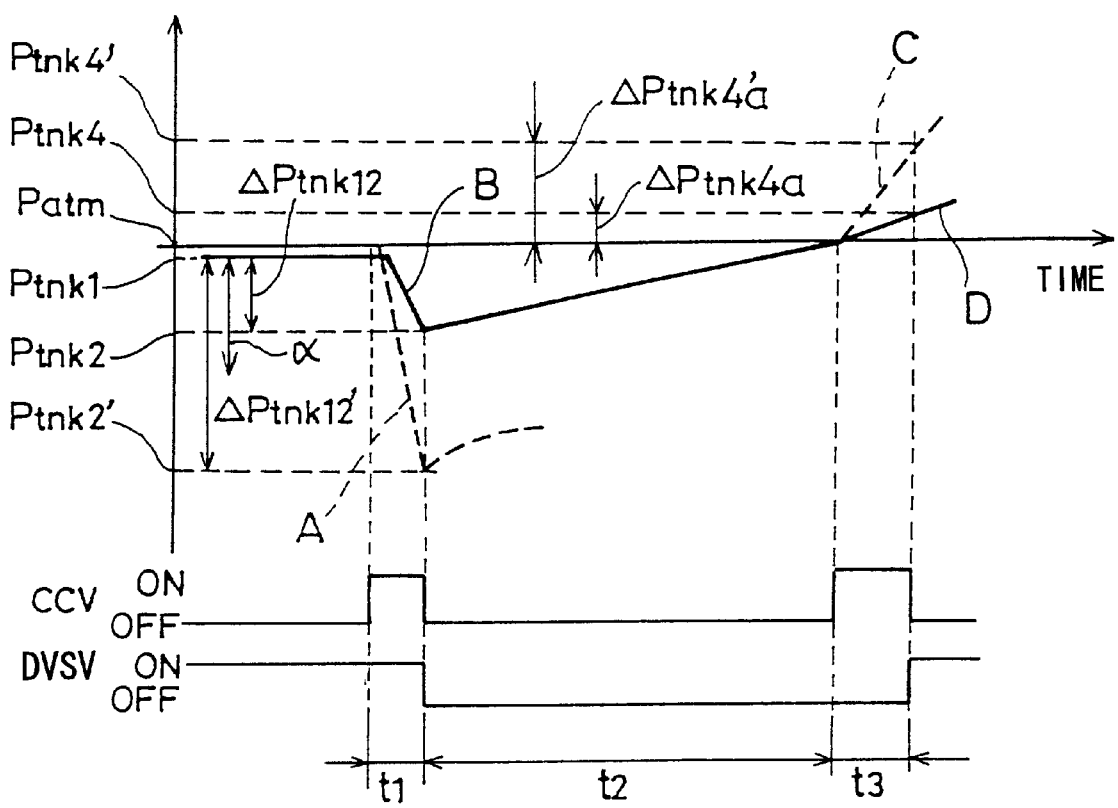
FIG. 17 is a diagram for explaining a change in the internal pressure of the fuel tank when the malfunction determination control routine is executed by the engine ECU.

FIG. 15 shows a malfunction determination control routine executed by the engine ECU 511 in the evaporated fuel system diagnostic apparatus of the present embodiment. FIG. 16 shows a vehicle control routine executed by the engine ECU 511 in the present embodiment. FIG. 17 shows a change in the internal pressure of the fuel tank 540 when the malfunction determination control routine is executed by the engine ECU 511.

The above-described evaporated fuel system is designed to prevent the fuel vapor of the fuel tank 540 from escaping into the atmosphere. In the evaporated fuel system, the fuel vapor, which is evaporated from the fuel within the fuel tank 540, is adsorbed in the canister 541, and the adsorbed fuel vapor is purged, at a proper time, from the canister 541 into the intake passage 537 via the purge passage 565 by using a negative pressure in the intake passage 537 of the engine 510.

The fuel vapor, which is evaporated from the fuel in the fuel chamber and the sub-tank 556, is delivered to the canister 541 through the first and second vapor exhaust passages 560 and 561. The fuel vapor is adsorbed in the canister 541.

When the engine 510 is running, the intake passage 537, which is located at the downstream portion of the throttle valve 536 in the intake passage 537, is in a negative pressure. If the purge control valve 543 is set in the valve-open position under such a condition, then the adsorbed fuel vapor from the canister 541 is purged into the intake passage 537 via the purge passage 565 by using the negative pressure of the intake passage 537. The fuel vapor, which enters the intake passage 537, is delivered, together with the intake air, to the engine 510. Hence, the evaporated fuel system can prevent the fuel vapor of the fuel tank 540 from escaping into the atmosphere.

When the fuel vapor is not purged from the canister 541 into the intake passage 537, the engine ECU 511 determines a fuel injection time TAU for the fuel injection valve based on the detected intake air flow rate Ga, such that the air-fuel ratio of the mixture, supplied to the combustion chamber of the engine 510, is set at a predetermined level (the stoichiometric ratio). In the present case, the air-fuel ratio of the mixture is maintained in the vicinity of the stoichiometric ratio by the control of the engine ECU 511, which provides appropriate exhaust emission of the engine 510.

When the fuel vapor is purged from the canister 541 into the intake passage 537, the amount of fuel in the mixture supplied to the combustion chamber of the engine becomes excessive by the amount of the purged fuel vapor. If the engine ECU 511 determines the fuel injection time TAU based on the detected intake air flow rate Ga in the same manner as in the above-mentioned case, the mixture supplied to the combustion chamber of the engine 510 becomes rich. In the present case, the fuel injection time TAU is corrected by using a feedback process, such that the actual fuel injection time is equal to the stoichiometric ratio. Namely, the fuel injection time TAU is reduced by a time corresponding to the amount of the purged fuel vapor. Hence, in the present case, the control of the engine ECU 511 provides appropriate exhaust emission of the engine 510 as well.

If a leakage-type malfunction, such as pipe disconnection, pipe cracking or fuel tank cracking, occurs in the evaporated fuel system, the fuel vapor will leak from the location of the malfunction. In order to suitably achieve the above-described operation of the evaporated fuel system, it is necessary that the evaporated fuel system diagnostic apparatus safely detect whether a leakage-type malfunction occurs in the evaporated fuel system.

In the evaporated fuel system diagnostic apparatus of the present embodiment, as soon as the conditions for starting the execution of the malfunction determination procedure are met, the canister closed valve 542 is set in the valve-closed position. At this time, the intake air, sent from the intake passage 537 to the fuel tank 540 via the air introducing pipe 550, is prevented from entering the vapor chamber 554 by the canister closed valve 542 in the valve-closed position. The internal pressure of the evaporated fuel system is reduced by the negative pressure of the intake passage 537, and reaches a reference pressure. After the reference pressure is reached, the purge control valve 543 is set in the valve-closed position to close the purge passage 565. At this time, both the valves 542 and 543 are set in the valve-closed position, and the evaporated fuel system is isolated.

When no leakage-type malfunction occurs in the evaporated fuel system, the internal pressure of the evaporated fuel system is gradually increased as the fuel within the system is increasingly evaporated into the fuel vapor. When a leakage-type malfunction occurs in the evaporated fuel system, the internal pressure of the evaporated fuel system is rapidly increased to the atmospheric pressure as the fuel vapor is increasingly leaking from the location of the malfunction. Therefore, the determination as to whether a leakage-type malfunction occurs in the evaporated fuel system can be performed based on a change of the internal pressure of the evaporated fuel system detected after the system is isolated.

However, there is a case in which a heavy load on the engine 510 is demanded to set the throttle valve 536 at a large opening angle during the time the negative pressure of the intake passage 537 is introduced into the evaporated fuel system to reduce the internal pressure of the system. If the throttle valve 536 is set at a large opening angle, the negative pressure in the intake passage 537 of the engine 510 is not sufficiently large to reduce the internal pressure of the evaporated fuel system. In such a case, the internal pressure of the evaporated fuel system may not reach the reference pressure, or much time is needed for the internal pressure of the evaporated fuel system to reach the reference pressure.

In the evaporated fuel system diagnostic apparatus of the present embodiment, an operating condition of the engine 510 is set, when the introduction of a negative pressure of the intake passage 537 into the fuel tank 540 is started, in a predetermined condition that causes the negative pressure of the intake passage 537 to be within a predetermined pressure range. When the operating condition of the engine 510 is set in the predetermined condition, an output force of the motor 524 is increased by an amount corresponding a decrease of an output force of the engine 510 calculated with respect to the engine operating condition that is set in the predetermined condition. As the operating condition of the engine 510 is set in the predetermined condition, the setting of the throttle valve 536 at a large opening angle is avoided. It is possible for the evaporated fuel system diagnostic apparatus of the present embodiment to maintain the negative pressure of the intake passage 537 that is sufficiently large to reduce the internal pressure of the evaporated fuel system.

Further, in the evaporated fuel system diagnostic apparatus of the present embodiment, when setting the operating condition of the engine 510 in the predetermined condition, the engine ECU 511 may control the throttle actuator 535 so that the throttle valve 536 is placed in the valve-closed position, causing the negative pressure of the intake passage 537 to be within the predetermined pressure range.

As shown in FIG. 15, at a start of the malfunction determination control routine, the engine ECU 511 at step S10 determines whether the conditions for starting the execution of the malfunction determination procedure are met. For example, in the step S10, when the operation of the engine 540 is started and the introduction of a negative pressure of the intake passage 70 into the fuel tank 60 is started before executing the malfunction determination, it is determined that the execution conditions are met.

The execution of the step S10 is repeated by the engine ECU 511 until the malfunction determination executing conditions are met. When the result at the step S10 is affirmative, the control of the engine ECU 511 is transferred to step S12.

The engine ECU 24 at step S12 sets an engine output lock flag ("EOLF") in ON state. When the executing conditions are met, the CCV 542 and the DVDV 543 in the evaporated fuel system are set in the valve-open position, and the BVSV 544 opens the connection between the purge nozzle 562 and the purge passage 565.

When the flag EOLF is set in ON state in the step S12, the vehicle control routine of FIG. 16 is carried out by the engine ECU 511 in the present embodiment. The execution of the vehicle control routine of FIG. 16 is repeatedly started by the engine ECU 511 each time the vehicle control routine is terminated.

As shown in FIG. 16, at a start of the vehicle control routine, the engine ECU 511 at step S50 determines whether the engine output lock flag EOLF is in ON state.

When the result at the step S50 is negative, the flag EOLF is set in OFF state. The engine ECU 511 at step S52 sends a normal motor control signal to the hybrid ECU 512 so that the engine ECU 511 and the hybrid ECU 512 carry out a normal hybrid control procedure. In the normal hybrid control procedure, the hybrid vehicle is suitably propelled by the sum of the engine output force and the motor output force that meets the running condition of the vehicle.

On the other hand, when the result at the step S50 is affirmative, the flag EOLF is set in ON state. The engine ECU 511 at step S54 performs an engine output lock mode procedure in which the operating condition of the engine 510 is set in a predetermined condition that causes the negative pressure of the intake passage 537 to be within a predetermined pressure range. At the same time, a lock-mode motor control signal is sent to the hybrid ECU 512 by the engine ECU 511. The hybrid ECU 512 controls the motor 524 so that the output force of the motor 524 is increased by an amount corresponding to a decrease of the engine output force calculated with respect to the engine operating condition that is set in the predetermined condition.

In the control routine of FIG. 15, after the step S12 is performed, the engine ECU 511 at step S14 detects a tank pressure Ptnk1 based on the signal supplied by the P sensor 545 at this time, and stores the tank pressure Ptnk1 in the memory of the engine ECU 511. As shown in FIG. 17, the tank pressure Ptnk1 is almost equal to the atmospheric pressure Patm, because the CCV 542 is set in the valve-open position in the step S14.

The engine ECU 511 at step S16 sets the CCV 542 in the valve-closed position to close the air introducing pipe 550. The engine ECU 511 at step S18 determines that a predetermined time t1 has elapsed after the air introducing pipe 550 is closed by the CCV 542. During the time t1, a negative pressure of the intake passage 537 is introduced into the vapor chamber 554 of the fuel tank 540 via the purge passage 565 and the pipe 563.

After the step S18 is performed, the engine ECU 511 at step S20 detects a tank pressure Ptnk2 based on the signal supplied by the P sensor 545 at this time, and stores the tank pressure Ptnk2 in the memory of the engine ECU 511.

The engine ECU 511 at step S22 calculates a pressure difference dPtnk12 between the tank pressure Ptnk1 (obtained in the step S14) and the tank pressure Ptnk2 (obtained in the step S20) by subtracting the latter from the former (dPtnk12=Ptnk1−Ptnk2).

After the step S22 is performed, the engine ECU 511 at step S24 determines whether the calculated pressure difference dPtnk12 is larger than a threshold value $\alpha$ (dPtnk12>$\alpha$). The threshold value $\alpha$ is predetermined through experimental measurement.

When the result at the step S24 is affirmative, it is determined that the negative pressure of the intake passage 537, which is sufficiently large in magnitude, is safely introduced into the fuel tank 540 in the evaporated fuel system. This means that the internal pressure of the evaporated fuel system has reached the reference pressure. In FIG. 17, the change of the tank pressure P in this case is indicated by the dotted line "A". The resulting tank pressure P after the introduction of the negative pressure of the intake passage 537 in this case is indicated "Ptnk2" in FIG. 17. The control of the engine ECU 511 in this case is transferred to step S26.

The engine ECU 511 at step S26 performs the leakage-type malfunction determination procedure for the bladder 655 of the fuel tank 540 and the evaporated fuel system 515. The leakage-type malfunction determination procedure is performed to check for pipe cranking and/or fuel tank cracking.

After the step S26 is performed, the engine ECU 511 at step S48 sets the engine output lock flag EOLF in OFF state. In the vehicle control routine of FIG. 16, the control of the engine ECU 511 is transferred from the engine output lock mode procedure to the normal hybrid control procedure. After the step S48 is performed, the control routine of FIG. 15 is terminated.

On the other hand, when the result at the step S24 is negative, it is determined that (1) the evaporated fuel system contains a large crack or (2) a large amount of fuel vapor is produced in the evaporated fuel system. In the present embodiment, the operating condition of the engine 510 is set in the predetermined condition, and, therefore, there is not the possibility that the negative pressure of the intake passage 537 is not sufficiently large in magnitude.

In order to locate a specific cause of the malfunction in the evaporated fuel system, steps S28 through S46 are provided in the malfunction determination control routine of the present embodiment as shown in FIG. 15.

When the result at the step S24 is negative, the engine ECU 511 at step S28 sets the DVSV 543 in the valve-closed position to close the purge passage 565. The engine ECU 512 at step S30 sets the CCV 542 in the valve-open position to open the air introducing pipe 550. In this case, the atmospheric pressure is introduced into the fuel tank 540 in the evaporated fuel system via the pipe 550, and the introduction of the negative pressure of the intake passage 537 into the fuel tank 540 is avoided. The tank pressure P in the evaporated fuel system will be increased from the negative pressure at the step S16 toward the atmospheric pressure.

The engine ECU 511 at step S32 maintains the condition of the evaporated fuel system until the tank pressure Ptnk3 reaches the atmospheric pressure Patm. As shown in FIG. 17, during a time t2, the condition of the evaporated fuel system is maintained by the step S36 and the tank pressure Ptnk is increased to the atmospheric pressure Patm.

After the step S32 is performed, the engine ECU 511 at step S34 sets the CCV 542 in the valve-closed position to close the air introducing pipe 550. The evaporated fuel system, which is placed at the atmospheric pressure, is isolated by closing both the air introducing pipe 550 and the purge passage 565.

The engine ECU 511 at step S36 determines that a predetermined time t3 has elapsed after the air introducing pipe 550 is closed by the CCV 542.

After the step S36 is performed, the engine ECU 511 at step S38 detects a tank pressure Ptnk4 based on the signal supplied by the P sensor 545 at this time, and stores the tank pressure Ptnk4 in the memory of the engine ECU 511. The engine ECU 511 at step S40 calculates a pressure difference $dPtnk4a$ between the atmospheric pressure Patm (obtained in the step S32) and the tank pressure Ptnk4 (obtained in the step S38) by subtracting the former from the latter ($dPtnk4a=Ptnk4-Patm$).

After the step S40 is performed, the engine ECU 511 at step S42 determines whether the calculated pressure difference $dPtnk4a$ is larger than a threshold value $\beta$ ($dPtnk4a>\beta$). The threshold value $\beta$ is predetermined through experimental measurement.

When the result at the step S42 is negative, it is determined that the evaporated fuel system contains a large crack (the above cause (1)). The pressure change of the fuel tank 540 in this case is indicated by the solid line "D" in FIG. 17.

When the result at the step S42 is affirmative, it is determined that a large amount of fuel vapor is produced in the evaporated fuel system (the above cause (2)). The pressure change of the fuel tank 540 in this case is indicated by the dotted line "C" in FIG. 17.

When the result at the step S42 is negative, the engine ECU 511 at step S44 outputs an indication that notifies the vehicle operator of the specific cause (1) of the malfunction in the evaporated fuel system: the evaporated fuel system contains a large crack. On the other hand, when the result at the step S42 is affirmative, the engine ECU 511 at step S46 outputs an indication that notifies the vehicle operator of the specific cause (2) of the malfunction in the evaporated fuel system: the evaporated fuel system contains a large crack.

In the above-described embodiment, the steps S14 through S44 executed by the engine ECU 511 correspond to the malfunction determination means in the claims, the steps S12 and S48 executed by the engine ECU 511 correspond to the operating condition setting means in the claims, the steps S50 through S54 executed by the engine ECU 511 correspond to the output force changing means in the claims, the step S24 executed by the engine ECU 511 corresponds to the first determination means in the claims, and the step S42 executed by the engine ECU 511 corresponds to the second determination means in the claims.

The evaporated fuel system diagnostic apparatus of the above-described embodiment can maintain the negative pressure of the intake passage that is sufficiently large to reduce the internal pressure of the evaporated fuel system. The evaporated fuel system diagnostic apparatus of the above-described embodiment is effective in quickly reducing the pressure in the evaporated fuel system to the reference pressure for the determination of the occurrence of a malfunction in the evaporated fuel system.

The present invention is not limited to the above-described embodiments, and variations and modifications may be made without departing from the scope of the present invention.

Further, the present invention is based on Japanese priority application No. 11-301612, filed on Oct. 22, 1999, and Japanese priority application No. 2000-111155, filed Apr. 12, 2000, the entire contents of which are hereby incorporated by reference.

What is claimed is:

1. A diagnostic apparatus for an evaporated fuel system, comprising:

a malfunction determination unit determining whether a malfunction in the evaporated fuel system occurs, by introducing a negative pressure of an intake passage of an internal combustion engine into a fuel tank; and an operating condition setting unit setting, when the malfunction determination unit has started the introduction of the negative pressure of the intake passage into the fuel tank, an operating condition of the engine in a predetermined condition that causes the negative pressure of the intake passage to be within a predetermined pressure range.

2. The diagnostic apparatus according to claim 1, wherein the operating condition setting unit controls a throttle valve, provided in the intake passage, to be placed in a valve-closed position, so that the operating condition of the engine is set in the predetermined condition.

3. A diagnostic apparatus for an evaporated fuel system of an automotive vehicle equipped with an internal combustion engine and a secondary power source, comprising:

a malfunction determination unit determining whether a malfunction occurs in the evaporated fuel system, by introduction of a negative pressure of an intake passage of the engine into a fuel tank;

an operating condition setting unit setting, when the malfunction determination unit has started the introduction of the negative pressure of the intake passage into the fuel tank, an operating condition of the engine in a predetermined condition that causes the negative pressure of the intake passage to be within a predetermined pressure range; and an output force changing unit increasing, when the operating condition setting unit has set the operating condition of the engine in the predetermined condition, an output force of the secondary power source by an amount corresponding to a decrease of an engine output force calculated with respect to the engine operating condition that is set in the predetermined condition.

4. The diagnostic apparatus according to claim 3, wherein the operating condition setting unit controls a throttle valve, provided in the intake passage, to be placed in a valve-closed position, so that the operating condition of the engine is set in the predetermined condition.

5. The diagnostic apparatus according to claim 3, wherein the malfunction determination unit includes:

a first determination unit determining whether a first change of an internal pressure of the fuel tank caused by the introduction of the negative pressure of the intake passage into the fuel tank, is above a threshold value; and a second determination unit determining, when the first pressure change is not above the threshold value, whether a second change of the internal pressure of the fuel tank, caused when the evaporated fuel system including the fuel tank is isolated after an atmospheric pressure is subsequently introduced into the fuel tank, lies within a predetermined range.

* * * * *